(12) United States Patent
Ghazaryan

(10) Patent No.: US 10,466,489 B1
(45) Date of Patent: Nov. 5, 2019

(54) METHODS AND APPARATUS FOR A VARIABLE-RESOLUTION SCREEN

(71) Applicant: Razmik Ghazaryan, Yerevan (AM)

(72) Inventor: Razmik Ghazaryan, Yerevan (AM)

(*) Notice: Subject to any disclaimer, the term of this patent is extended or adjusted under 35 U.S.C. 154(b) by 0 days.

(21) Appl. No.: 16/370,694

(22) Filed: Mar. 29, 2019

(51) Int. Cl.
| | |
|---|---|
| G03B 21/26 | (2006.01) |
| G02B 27/01 | (2006.01) |
| G03B 21/14 | (2006.01) |
| H04N 13/344 | (2018.01) |
| H04N 13/363 | (2018.01) |
| G06T 3/40 | (2006.01) |

(52) U.S. Cl.
CPC ....... *G02B 27/0172* (2013.01); *G03B 21/142* (2013.01); *G06T 3/4092* (2013.01); *H04N 13/344* (2018.05); *H04N 13/363* (2018.05)

(58) Field of Classification Search
CPC ...... G03B 21/26; G03B 21/14; G03B 21/142; G02B 27/0172; H04N 13/344; H04N 13/362
See application file for complete search history.

(56) References Cited

U.S. PATENT DOCUMENTS

| | | | |
|---|---|---|---|
| 3,668,984 A | 6/1972 | Rosin | |
| 4,621,892 A | 11/1986 | Kataoka | |
| 4,747,646 A | 5/1988 | Andrews | |
| 4,845,373 A | 7/1989 | Jamieson | |
| 5,136,675 A | 8/1992 | Hodson | |
| 5,398,082 A | 3/1995 | Henderson | |
| 6,356,700 B1 | 3/2002 | Strobl | |
| 6,573,819 B1 | 6/2003 | Oshima et al. | |
| 6,665,012 B1 | 12/2003 | Yang et al. | |
| 6,729,734 B2 | 5/2004 | Childers | |
| 6,945,652 B2 | 9/2005 | Sakata | |
| 6,991,336 B2 | 1/2006 | Matsui | |

(Continued)

OTHER PUBLICATIONS

"Apple has applied for a foveated rendering patent", Bets VR Tech, Feb. 27, 2018, website found at http://bestvr.tech/apple-applied-foveated-rendering-patent/ on Feb. 3, 2019.

(Continued)

*Primary Examiner* — Ryan D Howard
(74) *Attorney, Agent, or Firm* — Richard Baker; Lowenstein Sandler LLP

(57) ABSTRACT

A variable-resolution screen apparatus and methodology for transforming an image from a microdisplay, display or projector into a variable-resolution image is described herein. The apparatus and methodology could take a high resolution part and a low resolution part, which could be created as a continuous stream of images that are masked to split into two, or as two interleaved images separated by time (or both). The two image streams are reassembled, the high resolution portion into the low resolution background, using various optical embodiments. The various embodiments use beam splitters, beam combiners, shutters, optical masks, lenses, mirrors, optical slabs, lens arrays and other optics in various combinations to create the variable-resolution image. The image from the microdisplay, display or projector is split (in some embodiments), transformed, and recombined to display on a screen or viewer's retina. This apparatus could be implemented in a virtual reality headset.

30 Claims, 36 Drawing Sheets

(56) References Cited

U.S. PATENT DOCUMENTS

| | | |
|---|---|---|
| 7,102,700 B1 | 9/2006 | Pease |
| 7,164,881 B2 | 1/2007 | Donovan |
| 7,535,436 B2 | 5/2009 | Baker |
| 7,629,945 B2 | 12/2009 | Baudisch |
| 7,762,670 B2 | 7/2010 | Chiang |
| 8,125,408 B2 | 2/2012 | Baker |
| 8,824,873 B2 | 9/2014 | Oshima et al. |
| 9,001,028 B2 | 4/2015 | Baker |
| 9,185,373 B2 | 11/2015 | Baker |
| 9,607,428 B2 | 3/2017 | Li |
| 9,661,287 B2 | 5/2017 | Baker |
| 9,710,887 B1 | 7/2017 | Sahlsten |
| 9,711,072 B1 | 7/2017 | Konttori |
| 9,711,114 B1 | 7/2017 | Konttori |
| 9,874,752 B2 | 1/2018 | Gao |
| 9,905,143 B1 | 2/2018 | Konttori |
| 9,972,071 B2 | 5/2018 | Wilson |
| 9,983,413 B1 | 5/2018 | Sahlsten |
| 9,989,774 B1 | 6/2018 | Sahlsten |
| 10,054,797 B2 | 8/2018 | Spitzer |
| 10,140,695 B2 | 11/2018 | Wilson |
| 2002/0180869 A1 | 12/2002 | Callison |
| 2003/0117368 A1 | 6/2003 | Pedersen |
| 2004/0135744 A1 | 7/2004 | Bimber |
| 2004/0140965 A1 | 7/2004 | Wang |
| 2005/0068617 A1 | 3/2005 | Mizuno |
| 2005/0088425 A1 | 4/2005 | Sun |
| 2005/0128441 A1 | 6/2005 | Morgan |
| 2005/0206770 A1 | 9/2005 | Nathanson |
| 2005/0264525 A1 | 12/2005 | Adams |
| 2006/0119804 A1 | 6/2006 | Dvorkis |
| 2007/0024995 A1 | 2/2007 | Hayashi |
| 2007/0064199 A1 | 3/2007 | Schindler |
| 2007/0133635 A1 | 6/2007 | Heo |
| 2007/0176909 A1 | 8/2007 | Pavlowski |
| 2007/0205980 A1 | 9/2007 | Dijk |
| 2008/0037090 A1 | 2/2008 | Miller |
| 2008/0225005 A1 | 9/2008 | Carroll |
| 2009/0135317 A1 | 5/2009 | Lynam |
| 2010/0097393 A1* | 4/2010 | Yoneno .............. G03B 21/14 345/600 |
| 2016/0240013 A1 | 8/2016 | Spitzer |
| 2016/0260196 A1 | 9/2016 | Roimela |
| 2016/0267884 A1 | 9/2016 | Binstock |
| 2018/0003962 A1* | 1/2018 | Urey .............. G02B 27/0172 |
| 2018/0033405 A1 | 2/2018 | Tall |
| 2018/0068640 A1 | 3/2018 | Martin |
| 2018/0081178 A1 | 3/2018 | Shpunt |
| 2018/0136720 A1 | 5/2018 | Spitzer |
| 2018/0137602 A1 | 5/2018 | Spitzer |
| 2018/0269266 A1 | 9/2018 | Cancel Olmo |
| 2018/0275410 A1 | 9/2018 | Yeoh |
| 2018/0284451 A1 | 10/2018 | Eash |

OTHER PUBLICATIONS

"Foveated imaging for near-eye displays", Guanjun Tan, Yun-Han Lee, Tao Zhan, Jilin Yang, Sheng Liu, Dongfeng Zhao, and Shin-Tson Wu., Optics Express vol. 26, Issue 19, pp. 25076-25085 (2018), https://doi.org/10.1364/OE.26.025076.

"Assessment of Stereoscopic Multi-Resolution Images for a Virtual Reality System", Masahiko Ogawa, Kazunori Shidoji and Yuji Matsuki, 2009.

"Design and Applications of a High Resolution Insert Head Mounted Display", Akitoshi Yoshida, Jannick P. Rolland, John H. Reif, 1994.

"Evaluating Variable Resolution Displays With Visual Search: Task Performance and Eye Movements", Derrick Parkhurst, Eugenio Culurciello, Ernst Niebur, 2000.

"Foveated 3D Graphics", Brian Guenter, Mark Finch, Steven Drucker, Desney Tan, John Snyder, 2012.

"Gaze-Contingent Displays: Review and Current Trends", Andrew T. Duchowski, Nathan Cournia, Hunter Murphy, 2003.

"Gaze-Contingent Multiresolution Displays: An Integrative Review", Eyal M. Reingold, George W. McConkie, David M. Stampe, 2003.

"Hardware Improvements to the Helmet Mounted Projector on the Visual Display Research Tool (VDRT) at the Naval Training Systems Center", Dick Burbidge, Paul M Murray, 1989.

"High-Resolution Inserts in Wide-Angle Head-Mounted Stereoscopic Displays", Eric M. Howlett, 1992.

"High-Resolution Inset Head-Mounted Display", Jannick P. Rolland, Akitoshi Yoshida, Larry D. Davis, and John H. Reif, 1998.

"Keeping Things in Context: A Comparative Evaluation of Focus Plus Context Screens, Overviews, and Zooming", Patrick Baudisch, Nathaniel Good, Victoria Bellotti, and Pamela Schraedley, 2002.

"Latency Requirements for Foveated Rendering in Virtual Reality", Rachel Albert, Anjul Patney, David Luebke, and Joohwan Kim, 2017.

"Multi-Resolution-Display System for Virtual Reality Setups", Jurgen Gruninger, Hiiko Hoffmann, Uwe Kloos, and Jens Kruger, 2011.

"Optical Design and Analysis of a Head-Mounted Display With a High-Resolution Insert", Akitoshi Yoshida, Jannick P. Rolland, John H. Reif, 1995.

"Towards Foveated Rendering for Gaze-Tracked Virtual Reality", Anjul Patney, Marco Salvi, Joohwan Kim, Anton Kaplanyan, Chris Wyman, Nir Benty, David Luebke, Aaron Lefohn, 2016.

* cited by examiner

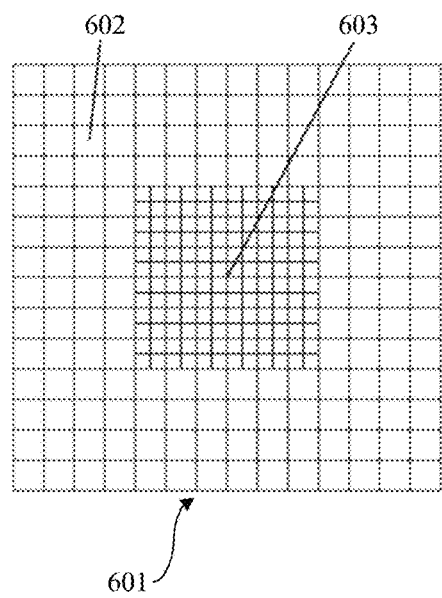 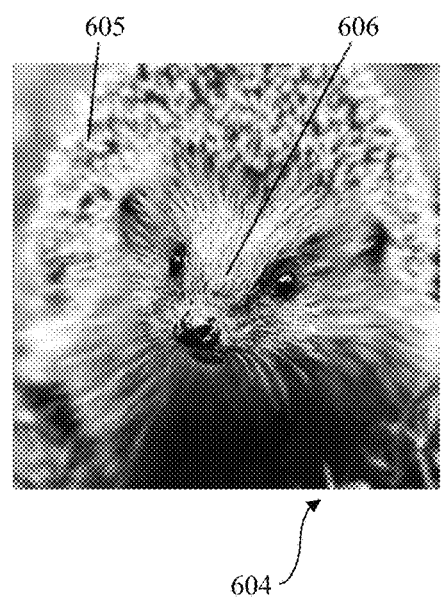
*Figure 6A*     *Figure 6B*

 
701    702
*Figure 7A*    *Figure 7B*

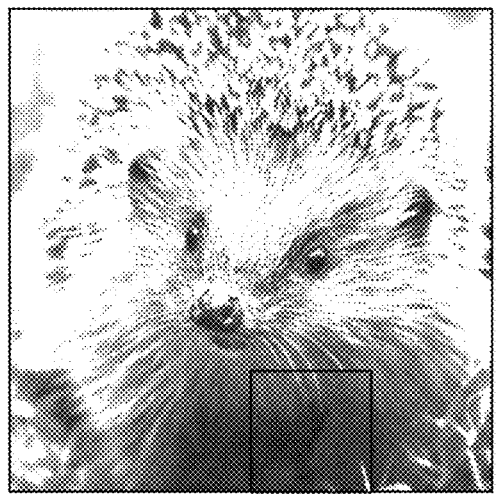 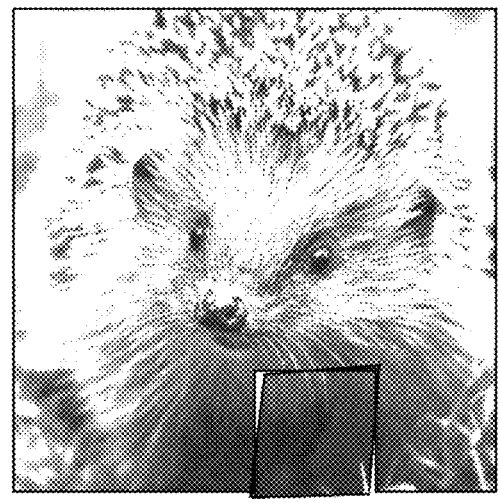
*Figure 8A*  *Figure 8B*

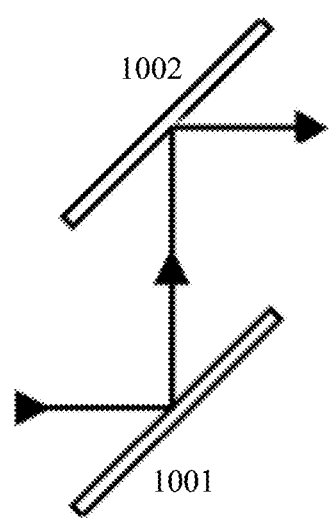 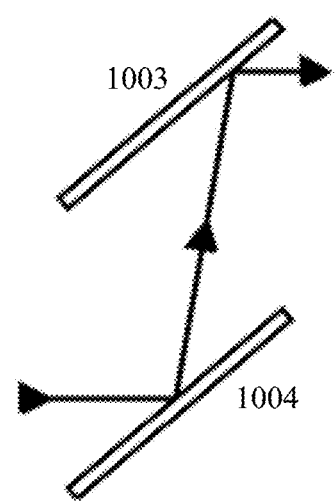
*Figure 10A*  *Figure 10B*

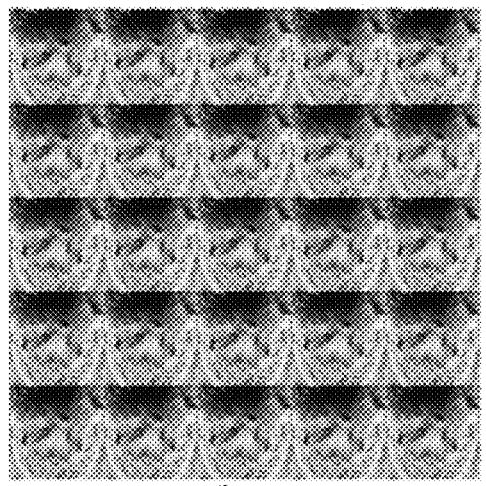
*Figure 16A*  *Figure 16B*

METHODS AND APPARATUS FOR A VARIABLE-RESOLUTION SCREEN

RELATED APPLICATIONS

None.

BACKGROUND

Technical Field

The systems, apparatuses and methods described herein generally relate to video projection systems and, in particular, to video projection systems for near-eye displays, such as in virtual reality headsets.

Description of the Related Art

Since the early days of computing and television, display systems have relied on displaying of visual information across a screen. Through the years, processing power and miniaturization have allowed the screen resolution to increase dramatically, but the basic approach of uniformly displaying pixels across the screen has prevailed. However, this approach requires significant increases in communications and computational performance to deliver all of the pixels as the resolution increases. These problems have become particularly acute with the advent of virtual reality headsets, where the images, when viewed through, but not limited to, an eyepiece or waveguide cover significant amount of the viewer's field of view compared to traditional displays and end up having some of their pixels usually or always in or near to the viewer's peripheral vision.

Traditional displays have pixels or scanlines with fixed sizes and distances from each other in typically a regular grid or similar uniformly distributed pixel or scanline pattern on a flat or slightly curved screen. See FIG. 1A which shows the single pixel 101 approach to display devices such as LCD (Liquid crystal display) or OLED (Organic light-emitting diode) computer or television displays. FIG. 1B shows the scanline approach 102 used in other display devices such as CRT (Cathode-ray tube) computer or television displays and CRT or LBS (Laser beam steering) video projectors. But the eye interprets the field of vision 103 with high resolution at the center 104 and a decreased vision at the periphery 105, as seen in FIG. 1C.

Although human vision is quite different from the single pixel 101 or scanline 102 design with far more photoreceptor cells and visual acuity in the foveal vision 104, this kind of fixed and even distribution of pixels or scanlines ensures a similar quality image when viewing every part of a screen from many distances and angles.

Current examples where this uniform distribution of pixels or scanlines does not apply is very limited and mostly unintentional, for example in the projection mapping industry where often 3d surfaces are used as the screens of video projectors.

Lately, a need for variable-resolution screens 103 has emerged because of increasing manufacturing costs of high resolution microdisplays, displays and projectors and much more demanding computational, bandwidth and storage requirements for display content created for traditional screens due to their increasing resolutions and fields of view, especially in virtual reality, augmented reality and mixed reality headsets (from now on referred to as "XR headsets").

Current XR headsets aim to provide a field of view close to the human field of view, which is on average 270 degrees horizontally by 135 degrees vertically taking into account eye rotations and is usually lower than that, for example 90 degrees horizontally by 100 degrees vertically for virtual reality headsets and lower than 50 degrees horizontally by 50 degrees vertically for augmented reality headsets which is still higher than many screens at normal viewing distances such as monitors, TVs and projection screens.

Other examples are video projectors that can be set up to project very wide and cover more of the viewer's field of view than with display technologies such as CRT, LCD, OLED or microLED monitors and TVs and projection screens at normal viewing distances.

A hybrid of the two is also a potential use case for this method and display apparatus such as has been demonstrated by HMPDs (Head-Mounted Projective Display) which are both a head-mounted device but project onto a retroreflective projection screen like the ones used for video projectors rather than to a waveguide or projection screen viewed with an eyepiece lens or other optics similar to other XR headsets.

At such high fields of view, the same amount of pixels or scanlines provides less pixels or scanlines per degree of the field of view of the viewer and can suffer from noticeable lack of detail, pixelation and screen-door effect or gap between scanlines.

Current methods of displaying less pixels in the periphery is done by having very high pixel density everywhere on the display and displaying less resolution on the pixels displayed near or in the viewer's peripheral vision rather than having less pixels or scanlines there to begin with. This is a technique the Sony PlayStation VR and Oculus Go head-mounted displays use (similar to 103).

This approach of increasing the pixel or scanline count on the display uniformly poses both cost and computational challenges as way more pixels or scanlines are required to cover the high fields of view, especially for the average human field of view of 270 degrees horizontally (195 degrees per eye) by 135 degrees vertically which for a 60 pixels per degree resolution needed for a 20/20 vision would require about 11,700 pixels horizontally and 8100 pixels vertically per eye.

Manufacturing custom screens with more pixels where the viewer's foveal view can reach will be very expensive and require custom display controllers.

Even if it were possible and economically feasible, the computational power required for creating real-time foveated content described above for such screens could be used for other tasks such as rendering and displaying more detailed virtual reality images in real-time.

So far methods have been proposed of optically combining two projectors or displays to achieve variable-resolution screens such as with a beam splitter. There are disadvantages to this approach such as higher cost, weight, size, requirement for color correction and synchronization between different displays or projectors and only being able to have one high resolution part and one low resolution part on the image with two displays or projectors (see the teachings in the following patents: US20160240013A1, U.S. Pat. No. 9,711,072B1, U.S. Pat. No. 9,983,413B1, U.S. Pat. No. 9,989,774B1, U.S. Pat. No. 9,711,114B1, U.S. Pat. No. 9,905,143B1).

Also, tilting beam splitters or steering an image with mirrors or prisms to reposition the high resolution area is challenging and results in perspective distortion and some optical aberrations which some of the methods described herein solve. Additionally, tilting or rotating mechanical parts have disadvantages associated with mechanically moving parts which some of the methods described herein solve.

BRIEF SUMMARY OF THE INVENTION

An optical apparatus for creating a variable-resolution image stream on a screen is described herein that is made up of a projector connected to a video source, where the projector transmits a light image stream in the form of a high resolution, small image component and a low resolution, large image component. This light image stream is sent to an image steering element that directs the high resolution, small image component and the low resolution, large image component to a small image optical element and to a large image optical element. The optical apparatus also includes an image separation element that separates the high resolution, small image component and the low resolution, large image component into a high resolution, small image stream and a low resolution, large image stream, where the small image optical element and the large image optical element focus the low resolution, large image stream and the high resolution, small image stream on the screen such that the low resolution, large image stream and the high resolution, small image stream appear as the variable-resolution image stream on the screen.

In some embodiments, the light image stream from the projector is time multiplexed between the high resolution, small image component in a first frame (frame n) and the low resolution, large image component in a next frame (frame n+1). The image separation element could be an optical shutter to manage the time multiplexing. Alternately, the light image stream from the projector could have the high resolution, small image component on one part of each image and a low resolution, large image component on another part of the image. The image separation element could be an optical mask (stencil) to support this embodiment.

In some embodiments, the screen is embedded in a virtual reality headset. The small image optical element could include a lens array. The image steering element could be a rotating optical slab, mirrors, beam splitter, wedge (Risley) prisms or optical masking elements. The large image optical element could be a lens or other optics that focuses the low resolution, large image stream to an outer portion of the screen or viewer's field of view. The small image optical element could be a lens or other optics that focuses the high resolution, small image stream to a center portion of the screen or viewer's field of view.

An optical method creating a variable-resolution image stream on a screen is described herein, where the method includes the steps of creating a light image stream in the form of a high resolution, small image component and a low resolution, large image component with a projector connected to a video source; directing the high resolution, small image component and the low resolution, large image component, with an image or beam steering element, to a small image optical element and to a large image optical element; separating the high resolution, small image component and the low resolution, large image component into a high resolution, small image stream and a low resolution, large image stream with an image separation element; and focusing, by the small image optical element and the large image optical element, the low resolution, large image stream and the high resolution, small image stream to form the variable-resolution image stream on the screen.

In some embodiments of the optical method, the light image stream from the projector is time multiplexed between the high resolution, small image component in a first frame (frame n) and the low resolution, large image component in a second frame (frame n+1). The separation of these components could be accomplished by using an optical shutter for the image separation element. In another embodiment of the optical method, the light image stream from the projector could have the high resolution, small image component on one part of each image and a low resolution, large image component on another part of the image, and the image separation element could be an optical mask (stencil).

In some embodiments of the optical method, the screen is embedded in a virtual reality headset. The small image optical element could include a lens array. The image steering element could be a rotating optical slab, mirrors, beam splitter, wedge (Risley) prisms or optical masking elements. The large image optical element could be a lens or other optics that focuses the low resolution, large image stream to an outer portion of the screen or viewer's field of view. The small image optical element could be a lens or other optics that focuses the high resolution, small image stream to a center portion of the screen or viewer's field of view. The screen could be a diffuse projection screen, a retroreflective projection screen or a curved mirror or Fresnel mirror which focuses a projection onto a viewer's retina (such as the ones used in collimated display systems). The screen could also be a viewer's retina. The projector could be a microdisplay or a display.

BRIEF DESCRIPTION OF THE DRAWINGS

FIG. 6A shows an illustration with rectangles representing individual pixels.

FIG. 6B shows an illustration with individual pixels displaying an actual image.

FIG. 7A shows an original image.

FIG. 7B shows a perspective distorted image.

FIG. 8A shows the image with no distortion or distortion mismatch corrected.

FIG. 8B shows the image with the distortion mismatch.

FIG. 10A illustrates offsetting the image or beam with two mirrors tilted 45 degrees.

FIG. 10B illustrates offsetting the image or beam with two mirrors tilted 40 degrees.

FIGS. 16A and 16B illustrates an image (FIG. 16A) as it is seen on a screen or viewer's retina (FIG. 16B) after using a lens array.

FIG. 19 shows the portions of the images to be optically and digitally rearranged do not have to be partitioned from the middle of the images.

DETAILED DESCRIPTION

Figure 1A:
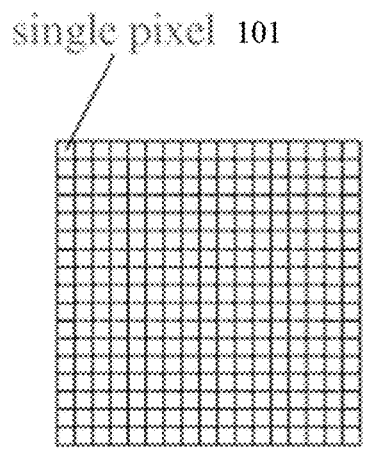
FIG. 1A shows the single pixel approach to display devices.
Figure 1B:
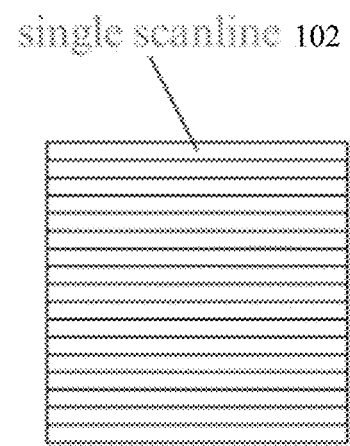
FIG. 1B shows the scanline approach to display devices.
Figure 1C:
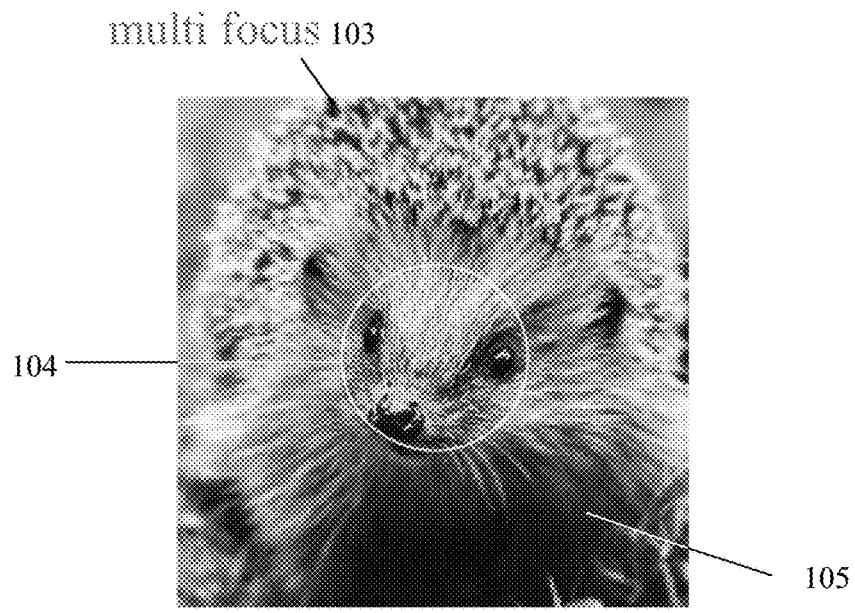
FIG. 1C shows a muli-focus approach to a display.

The present inventions describe a system and method for implementing a variable-resolution screen, where the area in front of the viewer's field of view, where the foveal vision expects the greatest resolution, are in a higher resolution than the areas of the screen on the periphery, where the peripheral vision expects less resolution and clarity. In this application four major (and many minor) embodiments are described.

The following inventions describe a method and display apparatus for achieving a variable-resolution screen, which can be defined as a screen which allows the image, when viewed directly or by, but not limited to, an eyepiece (the lens closest to the viewer's eye) or waveguide, provide a resolution which is not uniform across the image but rather more pixels or scanlines are visible to the viewer where needed on the image, such as the center of the viewer's field of view and less in other part or parts of the image.

Such a screen is different from existing screens displaying pre-rendered or real time-rendered foveated content as such methods of variable-resolution content display limit the high resolution part of the content to the native resolution possible with that part of the screen. The term "screen" can also be used to describe the viewer's retina.

Foveated content is an image, video or real time-generated images where on each image the resolution varies across the image, for example to show more resolution only where the viewer is looking, is able to look at or is meant to look at.

The variable-resolution screen methods and apparatus described here allow to achieve more resolution visible in one or more parts of the image than is possible with the microdisplay, display or projector when used without the methods described here.

The methods described need only existing computing hardware such as a PC, mobile phone or tablet to provide the pre-rendered or real time-rendered content for it.

The methods require as little as only a single DLP (Digital light processing), LCoS (Liquid crystal on silicon), LCD (Liquid crystal display), OLED (Organic light-emitting diode), MicroLED or similar microdisplay, display or projector or LBS (Laser beam steering) or similar projector 401, 411, 501, 511, 521, 551, 2301, 5111, 5121, 5151, 1401 for one variable-resolution screen or one of the above for one variable-resolution screen per eye, for example for head-mounted displays. Using as little as only a single microdisplay, display or projector or only one per eye allows to minimize the cost of producing such a variable-resolution screen apparatus, reduce weight and size of the apparatus. A single microdisplay, display or projector can also refer to microdisplays, displays or projectors where a separate display or microdisplay panel is used for each color channel and they are optically combined such as with a trichroic prism, X-cube prism or dichroic filters. This can be useful for various reasons such as eliminating color separation (also known as "rainbow artifact") and increasing the refresh rate.

The usage of such variable-resolution screens are, but not limited to, virtual reality, augmented reality and mixed reality headsets ("XR headsets") and video projectors.

Positioning with Mirrors or Wedge Prisms of a High Resolution Small Image Over a Low Resolution Large Image In one embodiment, a variable-resolution screen can be achieved by positioning a high resolution small image over a low resolution large image with mirrors or wedge (Risley) prisms.

To achieve a variable-resolution screen a single display technology such as a microdisplay or display 401, 411, 501, 511, 521, 551 is operated at fast refresh rates. Each consecutive frame (frame n+1) the microdisplay or display is used to either display a small high resolution part 204 or parts of the final image 205 or a large low resolution part 203 or parts of the final image 205 by sharing the refresh rate of the frames 201, 202 and final image 205 between the latter's two or more parts 203, 204. Persistence of vision blends the two parts 203, 204 into one final image 205. See FIG. 2.

Figure 2:
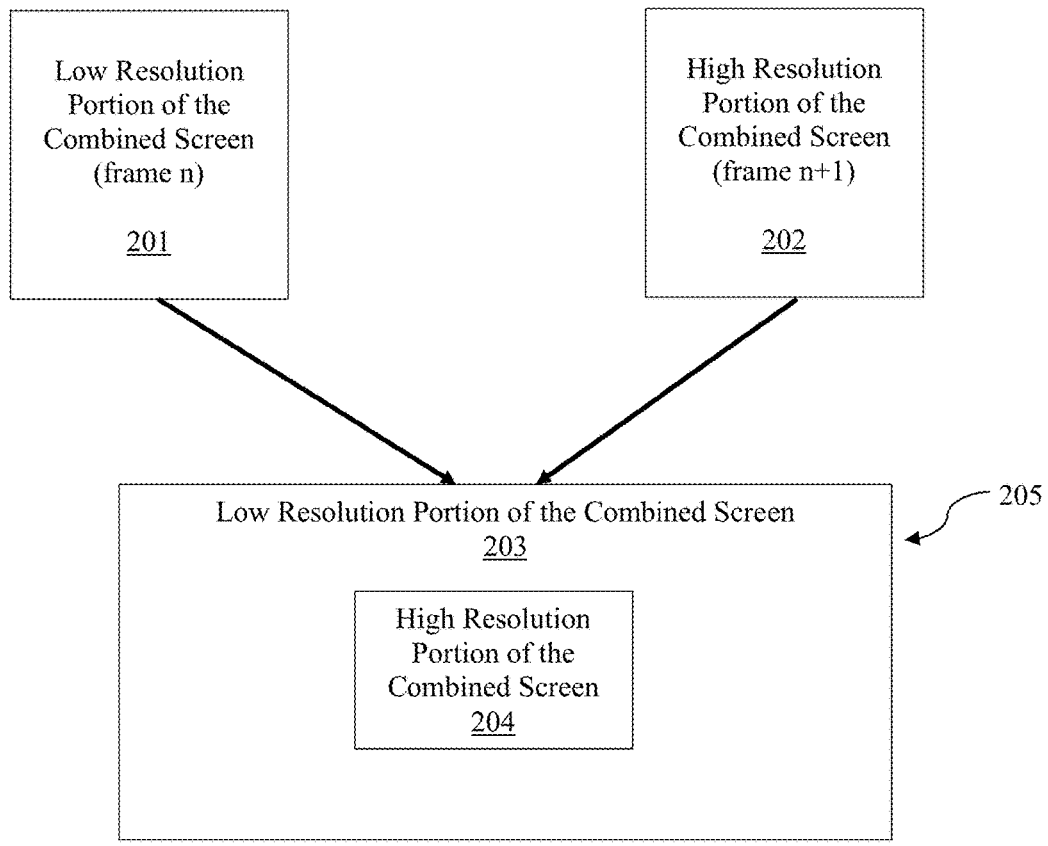
FIG. 2 illustrates using persistence of vision to blend images from two consecutive frames into one final image.

In FIG. 2, the frames alternate with the low resolution frame n 201 displayed followed by high resolution frame n+1 202. With a sufficient refresh rate, the eye interprets the two as a single image 205. The low resolution portion of the combined screen 203 could have a neutral color (black) in the high resolution area 204. And the high resolution portion of the combined screen 204 could have a neutral color (black) in the low resolution area 203. A slight overlap between the two regions 203, 204 will prevent a noticeable seam or gaps by having a blend region where regions 203, 204 overlap. In another embodiment, the low resolution section 203 is not masked and blends with the high resolution portion 204 in the area where the high resolution resides.

Alternatively, to achieve a variable-resolution screen a single display technology such as a microdisplay or display is optically split into two or more parts 301, 302. This method allows one part 301 or parts to use more pixels on the final image by sacrificing the resolution of another part 302 or parts on the final image. See FIG. 3.

The two methods can also be combined to allow to create more parts on the final image or to allow to create two or more final images by sharing both the resolution and refresh rate of the microdisplay or display between the parts, such as for using a single microdisplay or display to create final images for both eyes in a head-mounted display.

Figure 3:
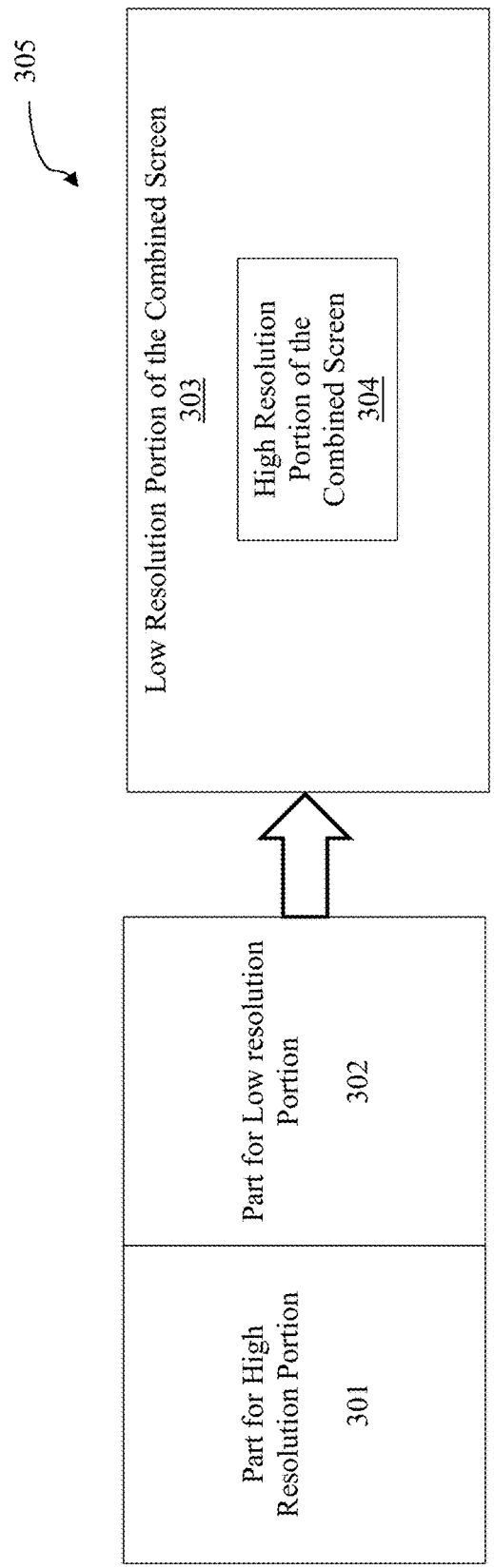
FIG. 3 shows splitting an image of a microdisplay, display or projector into two parts that are combined.

In FIG. 3, a 16:9 aspect ratio microdisplay or display split into two parts 301, 302 is shown, for example 1920×1080 pixel microdisplay or display split into a small 1080×1080 pixel high resolution part 301 and a large 840×1080 pixel low resolution part 302 (the latter may then be optically flipped 90 degrees for a better aspect ratio).

Using optical or optical and mechanical and also optionally digital methods, the parts 301 and 302 can be resized and superimposed on each other 305. The large low resolution part 303 can be masked where the small high resolution part is 304 and where they overlap.

The masking can further be made more seamless by blending the edges optically or digitally by making the transition less abrupt with a digital resolution falloff in the high resolution small image or dimming the pixels with a falloff on both images.

The brightness levels between the two parts may be balanced optically such as with neutral density filters or digitally.

Figure 4A:
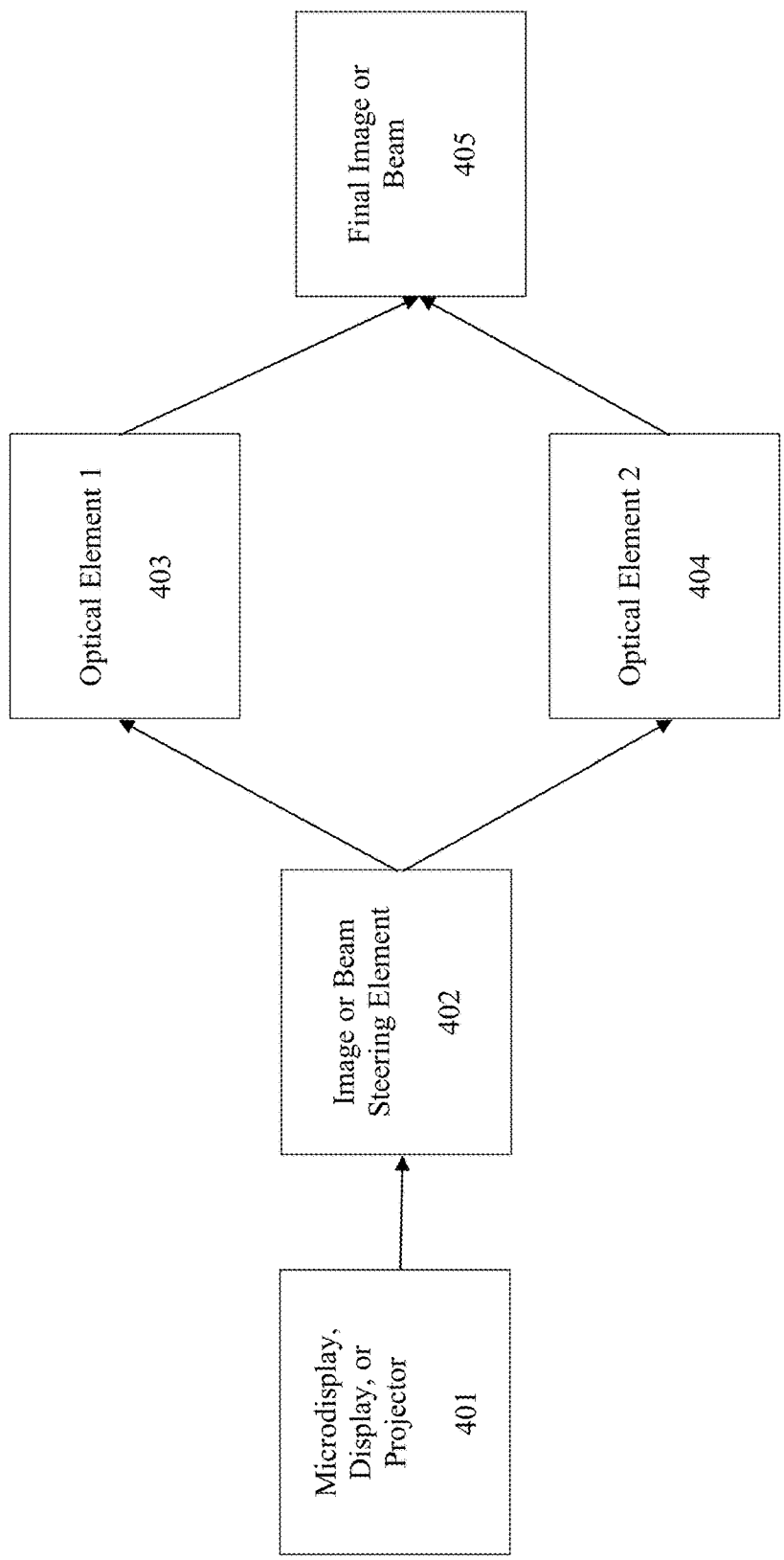
FIG. 4A is a functional flow of the light through the optical functions in the simplest embodiment.
Figure 4B:
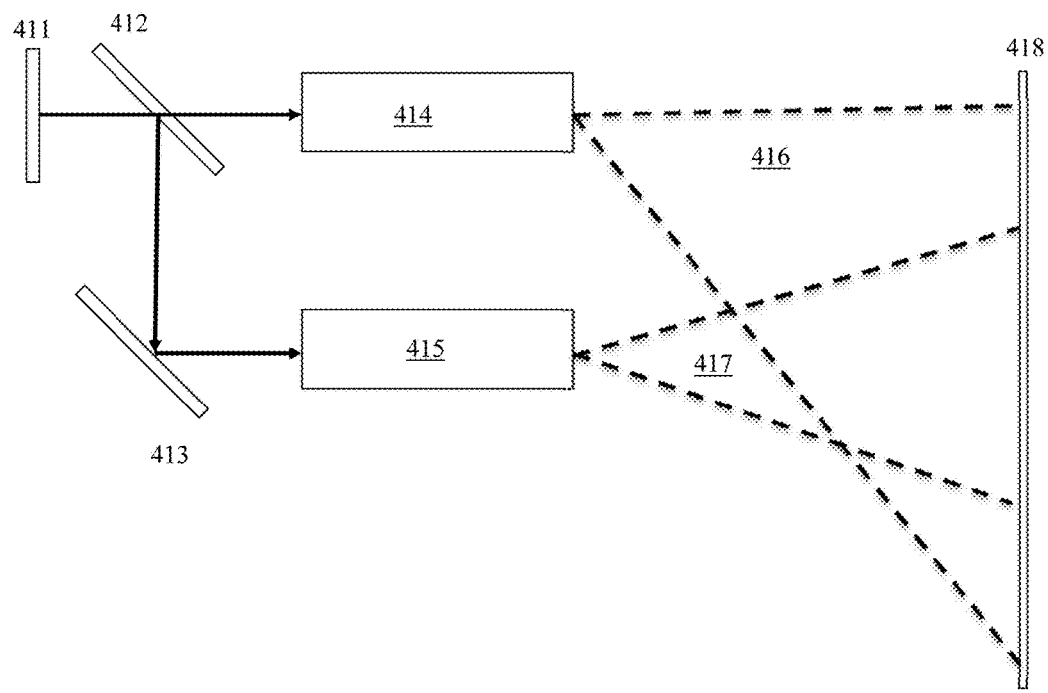
FIG. 4B is a hardware flow of the light through the optical elements in the simplest embodiment.

Look to FIGS. 4A and 4B. To be able to use the same microdisplay or display 401, 411 for each part which have a different size and position on the final image 405, with the first method from FIG. 2, the image of the microdisplay or display is steered with a steering element optomechanically or optically, such as, but not limited to, a rotating mirror or beam splitter 402, 412 and an optional mirror 413, only to one of two optical elements 403, 404, 414, 415 for each frame. In case of using a beam splitter instead of a rotating mirror as the steering element, each image each frame must be blocked or let to pass accordingly before, inside or after the optical element 403, 404, 414, 415 with an optical or mechanical shutter such as an LCD shutter in order to prevent 403, 414 and 404, 415 from receiving the same image of every frame instead of the different images of different consecutive frames. This is of course not needed if a polarizer beam splitter is used and the polarization of the image can be controlled each frame before it reaches the beam splitter, such as with a switchable liquid crystal polarization rotator.

To be able to use the same microdisplay or display 401, 411 for each part which have a different size and position on the final image 405, with the second method from FIG. 3, the image of the microdisplay or display 401, 411 is steered with a steering element such as, but not limited to, a beam splitter or a mirror on an image plane 402, 412 and an optional mirror 413, to two optical elements 403, 404, 414, 415. In case of using a beam splitter and not a mirror on an image plane, each image is then masked accordingly before, inside or after the optical element 403, 404, 414, 415 with an optical masking element such as a stencil. The mirror or stencil must be on an image plane to create a sharp cut.

Steering element 402, 412 may be, but is not limited to, a mirror, mirrors, beam splitter and optical or mechanical shutter or shutters combined with one of the above.

The optical element 403, 404, 414, 415 may be, but is not limited to, one of the following, or a combination of: lenses, mirrors, prisms, free-form mirrors.

One of the optical elements 404, 415 may create a small image 417 and the other optical element 403, 414 a comparably large image 416.

In FIG. 4A, the microdisplay or display 401 creates the image and optically sends it to the image or beam steering element 402. The image steering element 402 splits the image into two (or more) images, sending the images to optics creating the low resolution, large image 403 and a high resolution, small image 404. The optical output of the optics 403, 404 are sent to a screen 418 or onto the viewer's retina where the final image is created 405.

Looking to FIG. 4B, the microdisplay or display 411 creates an image that is split with a beam splitter (such as half silvered mirror or polarizer beam splitter) 412 into two identical images going in different directions. One is directed to optics which create a large image 414, while the other goes through a mirror 413 to another optics which creates a small image 415. The large image optics 414 create the lower resolution image 416. The small image optics 415 creates the higher resolution image 417. Both the lower 416 and higher 417 resolution images are projected on the screen 418 or on the viewer's retina as seen in FIG. 5B.

Masking of the area of the large image 416 where the small image 417 is can be achieved, again, digitally, by having black pixels displayed there, or optically, for example by having a stencil on an image plane somewhere inside, before or after the optics to physically (optically) mask off that part of the image.

Figure 5A:
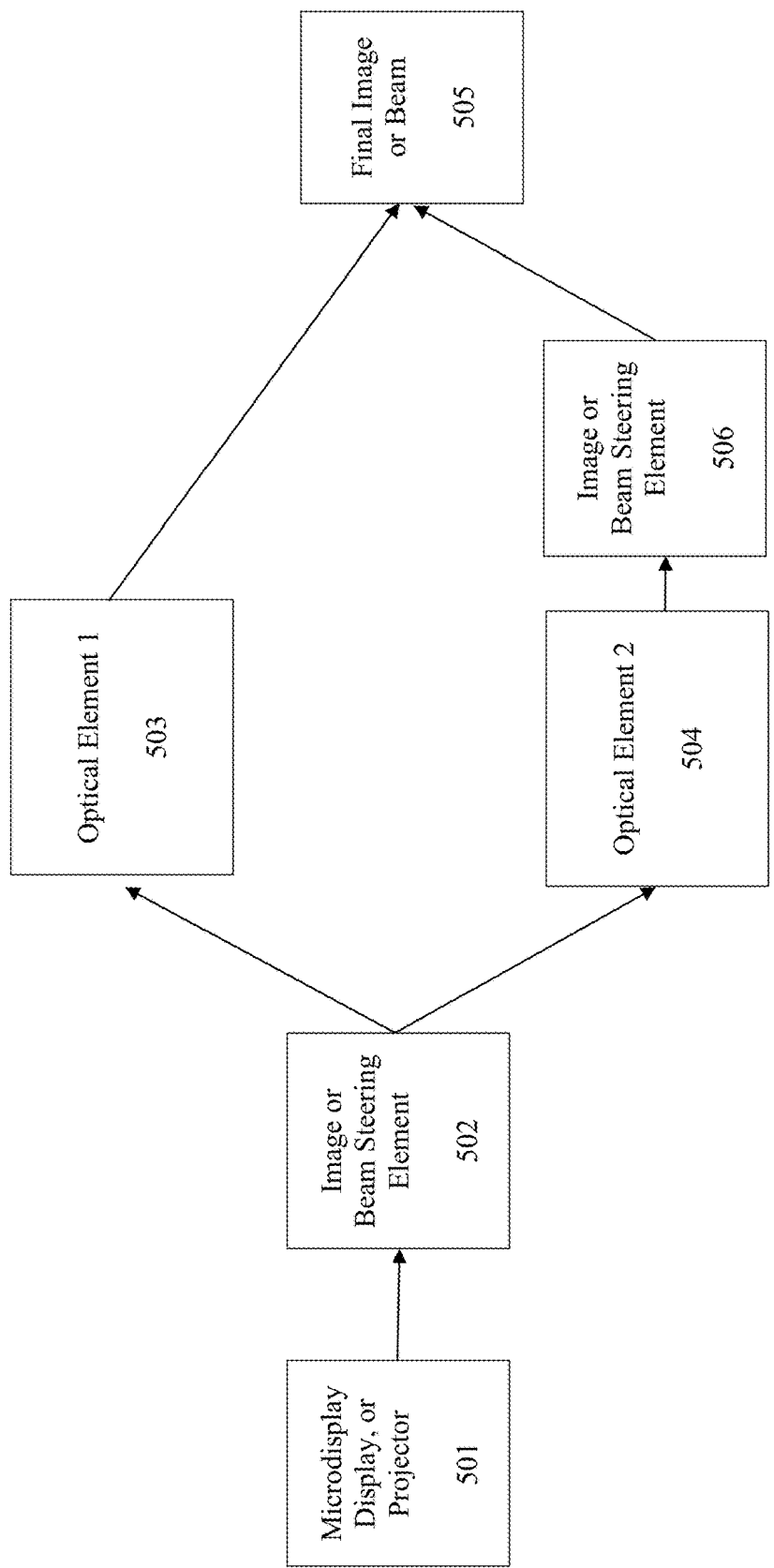
FIG. 5A is a functional flow of the light through the optical functions in a slightly more complex embodiment.
Figure 5B:
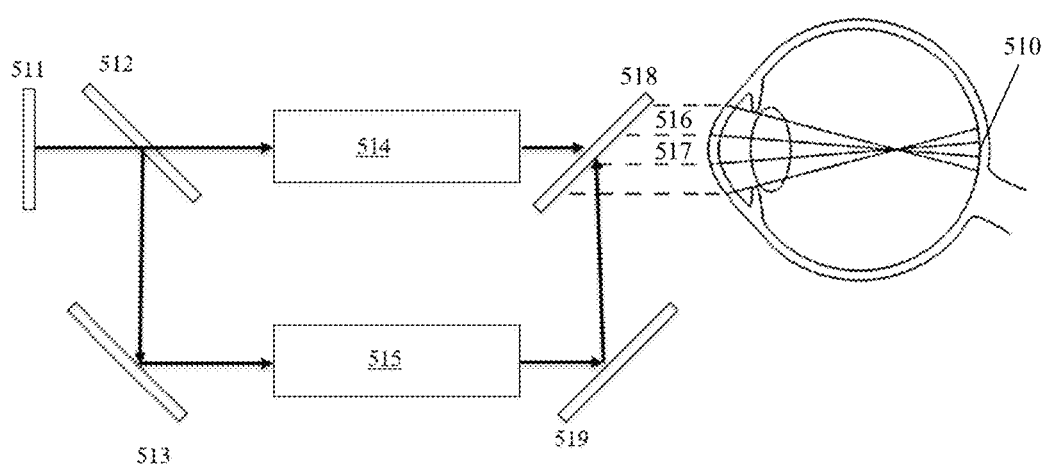
FIG. 5B is a hardware flow of the light through the optical elements in a slightly more complex embodiment.

Then, optionally, the positioning of the small image can be achieved with, but not limited to one or more of the following: actuators with mirrors, galvanometer scanners, actuators with wedge (Risley) prisms, actuators with tilting or shifting lenses, as seen in FIG. 5A.

FIG. 5A shows a microdisplay or display 501 creating an image that is sent to an image or beam steering element 502 (could be a beam splitter). One of the two identical images is sent to the large image optical element 503 and the other image is sent to the small image optical element 504. The small image optical element 504 sends the image to an image or beam steering element 506 (could be a mirror). The images are then combined into a final image 505.

The two images are optically combined, such as with a beam splitter and viewed directly, or through, but not limited to, an eyepiece or waveguide.

Looking to FIG. 5B, the optical elements are shown. The microdisplay or display 511 sends the image to a beam splitter or a rotating mirror 512, that sends images to the large image optics 514 and to a mirror 513 that redirects the image to the small image optics 515. From the small image optics 515, the image is sent to a mirror 519 and then to a beam combiner 518 (beam splitter) to combine with the output of the large image optics 514. From the beam combiner 518, the large image 516 and the small image 517, are sent as a combined image to the viewer's retina 510. In case of using a beam splitter instead of a rotating mirror as the steering element, each image each frame must be blocked or let to pass accordingly before, inside or after the optical element 514, 515 with an optical or mechanical shutter such as an LCD shutter in order to prevent 514 and 515 from receiving the same image of every frame instead of the different images of different consecutive frames. This is of course not needed if a polarizer beam splitter is used and the polarization of the image can be controlled each frame before it reaches the beam splitter, such as with a switchable liquid crystal polarization rotator.

Figure 5C:
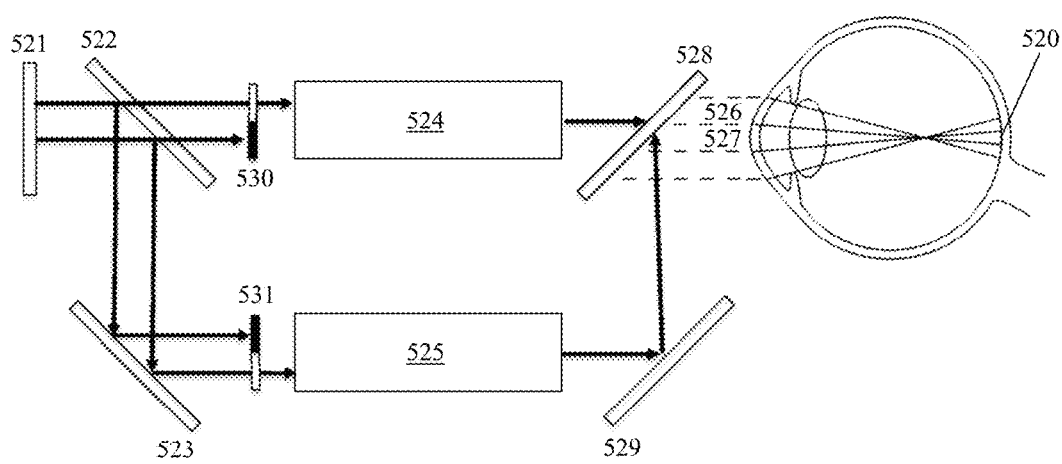
FIG. 5C is a hardware flow of the light through the optical elements as in the previous drawing with an optical mask (stencil).

One difference between FIGS. 5B and 5C is that images are illustrated as two lines rather than one before reaching the optical masking elements. This is done to illustrate how the image is masked/cropped by the optical masking elements 530, 531.

Looking to FIG. 5C, the optical elements are shown, for processing the image structure in FIG. 3. The microdisplay or display 521 sends the images to a beam splitter 522, that sends two identical images, one to a mirror 523 first, to optical masking elements (stencils, physical barriers to hide part of the image) 530, 531. The stencil must be on an image plane to create a sharp cut, so can also be inside the optics (524 and 525), or after the optics.

The images leave from the stencils 530, 531 to the large image optics 524 and to the small image optics 525. From the small image optics 525, the image is sent to a mirror 529 and then to a beam combiner 528 (beam splitter) to combine with the output of the large image optics 524. From the beam combiner 528, the large image 526 and the small image 527, are sent as a combined image to the viewer's retina 520.

Figure 5D:
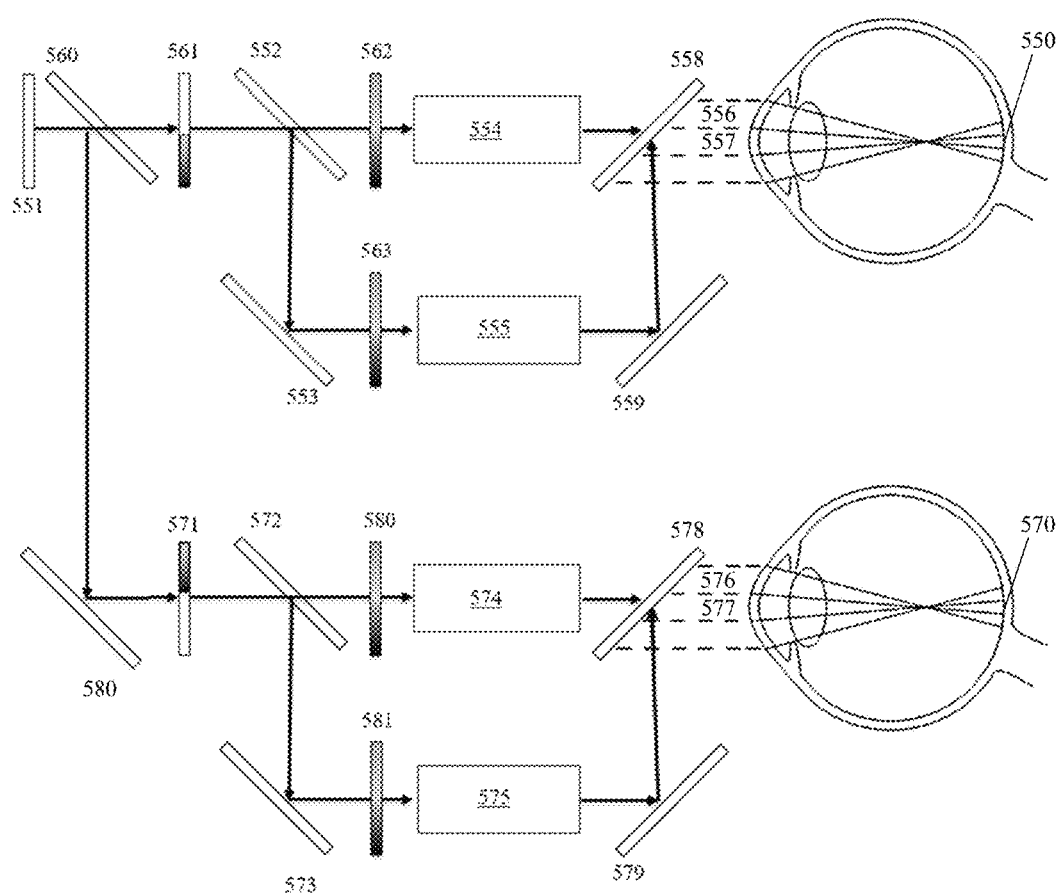
FIG. 5D is a hardware flow of the light through the optical elements as in the FIG. 5B for each eye in a head-mounted display.

Looking to FIG. 5D we see a head-mounted display embodiment which uses a single microdisplay or display 551 for both eyes. First the resolution of the microdisplay or display is split between eyes, then each frame is used only for one projection (large or small image). For example with a 240 Hz DLP microdisplay this provides 120 Hz refresh rate per image per eye.

The microdisplay or display 551 sends the image to a beam splitter 560 that sends two identical images, one to a mirror 580 first, to the stencils 561, 571 that mask off the portion of the image not destined for the specific eye. In one embodiment, the stencils 561, 571 could be shutters such as an LCD shutter or LCD pi-cell so each frame will be sent only to one optics and blocked for the rest of the optics 554, 555, 574, 575, such as in the instance seen in FIG. 2. In another embodiment, the stencils 561, 571 could be removed so each frame the whole image will be sent only to one optics and blocked for the rest of the optics 554, 555, 574, 575, such as in the instance seen in FIG. 2. For example with a 240 Hz DLP microdisplay this provides 60 Hz refresh rate per image per eye.

The left stencil (top in the diagram) 561 sends the image to a second beam splitter 552 which send two identical images, one to a mirror 553 first, to the two LCD shutters 562, 563 for the FIG. 2 embodiment. The shutters 562, 563 could be replaced with stencils (a physical barrier to hide part of the image) for the FIG. 3 embodiment. The stencils have to be on an image plane to create a sharp cut, so can also be inside the optics (554 and 555), or after the optics.

The images leave from the shutters (or stencils) 562, 563 to the large image optics 554 and to the small image optics 555. From the small image optics 555, the image is sent to a mirror 559 and then to a beam combiner 558 (beam splitter) to combine with the output of the large image optics 554. From the beam combiner 558, the large image 556 and the small image 557, are sent as a combined image to the viewer's retina 550.

The right stencil (bottom in the diagram) 571 sends the image to a second beam splitter 572 which sends two identical images, one to a mirror 573 first, to the two LCD shutters 580, 581 for the FIG. 2 embodiment. The shutters 580, 581 could be replaced with stencils for the FIG. 3 embodiment. The stencils must be on an image plane to create a sharp cut, so can also be inside the optics (574 and 575), or after the optics.

The images leave from the shutters (or stencils) 580, 581 to the large image optics 574 and to the small image optics 575. From the small image optics 575, the image is sent to a mirror 579 and then to a beam combiner 578 (beam splitter) to combine with the output of the large image optics 574. From the beam combiner 578, the large image 576 and the small image 577, are sent as a combined image to the viewer's retina 570.

Due to persistence of vision with the method in FIG. 2 and masking with the method in FIG. 3 the two parts appear as one uniform image 604 in FIG. 6B.

In FIG. 6A, the illustration shows rectangles representing individual pixels 601. FIG. 6B shows an illustration with individual pixels displaying an actual image 604.

Since the small high resolution part 603, 606 in the final image 601, 604 can be smaller than it could be without the use of these methods, the variable-resolution screen method and apparatus described here allows to achieve more resolution visible in one or more parts of the image than is possible with the display technology when used without the methods described here.

This allows to achieve a variable-resolution screen, such as a head-mounted display screen which uses only one microdisplay or display or one per eye with a high pixel or scanline density in the center of the field of view of the viewer and less in the periphery.

Optionally, by adding eye tracking via, but not limited to, gaze tracking cameras or electrodes, the small high resolution part 603, 606 can be positioned on the final image 601, 604 on the large low resolution part 602, 605 where the viewer's foveal view is at any given point in time. This allows to always have more pixels or scanlines concentrated in the foveal and optionally also in the near peripheral view of the viewer at any given point in time.

Optionally the positioning of the large low resolution part 602, 605 can be achieved the same way the positioning of the small high resolution part 603, 606, for example to have pixels only in the field of view of the viewer's eye and not the total field of view of the viewer which takes into account eye rotations.

There can also be more than two parts, such as three, one for the foveal view, one for near peripheral and one for far peripheral and they can be combined and optionally positioned the same way as mentioned above.

Those skilled in the art will understand that the order of some elements can be changed and more can be added, such as steering both large and small images together after they are optically combined, or adding more elements for creating more small or large parts on the final image.

Positioning with Mirrors or Wedge Prisms of a High Resolution Narrow Projection Beam Over a Low Resolution Wide Projection Beam In another embodiment, a variable-resolution screen is achieved by positioning a high resolution narrow video projection over a low resolution wide video projection with mirrors or wedge (Risley) prisms.

To achieve a variable-resolution screen a single video projector such as a single illuminated microdisplay, display, LBS (Laser beam steering) projector or other type of video projector (from now on referred to as "projector") 401, 411, 501, 511, 521, 551, 5111, 5121, 5151 is operated at fast refresh rates. Each consecutive frame (frame n+1) the projector is used to either display a small high resolution part 204 or parts of the final image 205 or a large low resolution part 203 or parts of the final image 205 by sharing the refresh rate of the frames 201, 202 and final image 205 between the latter's two or more parts 203, 204. Persistence of vision blends the two parts 203, 204 into one final projected image 205.

Alternatively, in FIG. 3, to achieve a variable-resolution screen 305 a single video projector such as a single illuminated microdisplay, display, LBS (laser beam steering) projector or other type of video projector (from now on referred to as "projector") is optically split into two or more parts 301, 302. This method allows one part 301, 304 or parts to use more pixels on the final projected image 305 by sacrificing the resolution of another part 302, 303 or parts.

The two methods can also be combined to allow to create more parts on the final projected image or to allow to create two or more final projected images by sharing both the resolution and refresh rate of the projector between the parts, such as for using a single projector to create final projected images for both eyes in a head-mounted display.

There are several advantages to using projection beams rather than microdisplays and displays when viewed directly or through lens or other optics:

First of all, it is very challenging to design a wide field of view head-mounted display when using microdisplays while trying to keep the magnification lenses or other optics small and lightweight versus using much smaller projection lenses to project onto a screen larger than the microdisplay and viewing that screen through lenses or other optics instead.

Second, using video projections has the advantage of allowing to have all of the optical elements including steering elements be much smaller as they can be positioned in the optical design before, or somewhere in between the projection optics which create the large final image on a projection screen.

Third, due to the external illumination nature of reflective microdisplays such as LCoS, DLP and transmissive microdisplays such as LCD, the beam angle for each pixel can be narrower than with emissive microdisplays such as OLED or microLED which can allow to provide an optical system with less stray light and be more efficient while providing the same or higher brightness to the viewer.

Fourth, due to the external illumination nature of reflective and transmissive microdisplays much higher brightness is achievable than with emissive microdisplays which have the physical pixels emit the light themselves like OLEDs and microLEDs or with LCD displays which makes it challenging to have them provide enough brightness, especially as the field of view and magnification of the display increases, or for augmented reality head-mounted displays where there can be a lot of light loss in the optical system.

In FIG. 3, a single 16:9 aspect ratio microdisplay or display is split into two parts, for example 1920×1080 pixel microdisplay or display split into a small 1080×1080 pixel high resolution part 301 and a large 840×1080 pixel low resolution part 302 (the latter may then be optically flipped 90 degrees for a better aspect ratio).

Using optical or optical and mechanical and also optionally digital methods, the parts 301 and 302 can be resized and superimposed on each other 305 and the large low resolution part 303 can be masked where the small high resolution part 304 is and where they overlap.

The masking can further be made more seamless by blending the edges optically or digitally by making the transition less abrupt with a digital resolution falloff in the high resolution small image or dimming the pixels with a falloff on both images.

The brightness levels between the two parts may be balanced optically such as with neutral density filters or digitally.

Look to FIGS. 4A and 4B. To be able to use the same projector 401, 411 for each part which have a different size and position on the final projected image 405, with the first method from FIG. 2, the beam of the projector is steered with a steering element optomechanically or optically, such as, but not limited to, a rotating mirror or beam splitter 402, 412 and an optional mirror 413, only to one of two optical elements 403, 404, 414, 415 for each frame. In case of using a beam splitter instead of a rotating mirror as the steering element, each beam each frame must be blocked or let to pass accordingly before, inside or after the optical element 403, 404, 414, 415 with an optical or mechanical shutter such as an LCD shutter in order to prevent 403, 414 and 404, 415 from receiving the same beam of every frame instead of the different beams of different consecutive frames. This is of course not needed if a polarizer beam splitter is used and the polarization of the beam can be controlled each frame before it reaches the beam splitter, such as with a switchable liquid crystal polarization rotator.

To be able to use the same projector 401, 411 for each part which have a different size and position on the final image 405 on the screen 418, with the second method from FIG. 3, the beam of the projector 401, 411 is steered with a steering element such as, but not limited to, a beam splitter or a mirror on an image plane 402, 412 and an optional mirror 413, to two optical elements 403, 404, 414, 415. In case of using a beam splitter and not a mirror on an image plane, each beam is then masked accordingly before, inside or after the optical element 403, 404, 414, 415 with an optical masking element such as a stencil. The mirror or stencil must be on an image plane to create a sharp cut.

Steering element 402, 412 may be, but is not limited to, a mirror, mirrors, beam splitter and optical or mechanical shutter or shutters combined with one of the above.

The optical element 403, 404, 414, 415 may be, but is not limited to, one of the following, or a combination of: lenses, mirrors, prisms, free-form mirrors.

One of the optical elements 404, 415 may create a narrow beam 417 and the other optical element 403, 414 a comparably wide beam 416.

Looking to FIG. 4B, the projector 411 creates a projection beam that is split with a beam splitter (such as half silvered mirror or polarizer beam splitter) 412 into two identical projection beams going in different directions. One is directed to optics 414 which create a wide beam, while the other goes through a mirror 413 to another optics 415 which creates a narrow beam. The wide beam optics 414 create the lower resolution image beam 416. The narrow beam optics 415 creates the higher resolution image beam 417. Both the lower 416 and higher 417 resolution beams are projected onto the viewer's retina or screen 418.

Masking of the area of the wide beam 416 where the narrow beam 417 is can be achieved, again, digitally by having black pixels displayed there, or optically, for example by having a stencil on an image plane somewhere inside, before or after the optics to physically (optically) mask off that part of the projection beam.

Then, optionally, the positioning of the small image of the narrow beam can be achieved with, but not limited to one or more of the following: actuators with mirrors, galvanometer scanners, actuators with wedge (Risley) prisms, actuators with tilting or shifting lenses, as seen in FIG. 5A.

The two beams are projected onto the same screen as seen in FIG. 4B or first optically combined, such as with a beam splitter, projected onto a screen and viewed directly, or through, but not limited to, an eyepiece or waveguide. This is seen in the beam steering elements 519 and 518 of FIG. 5B.

Figure 5E:
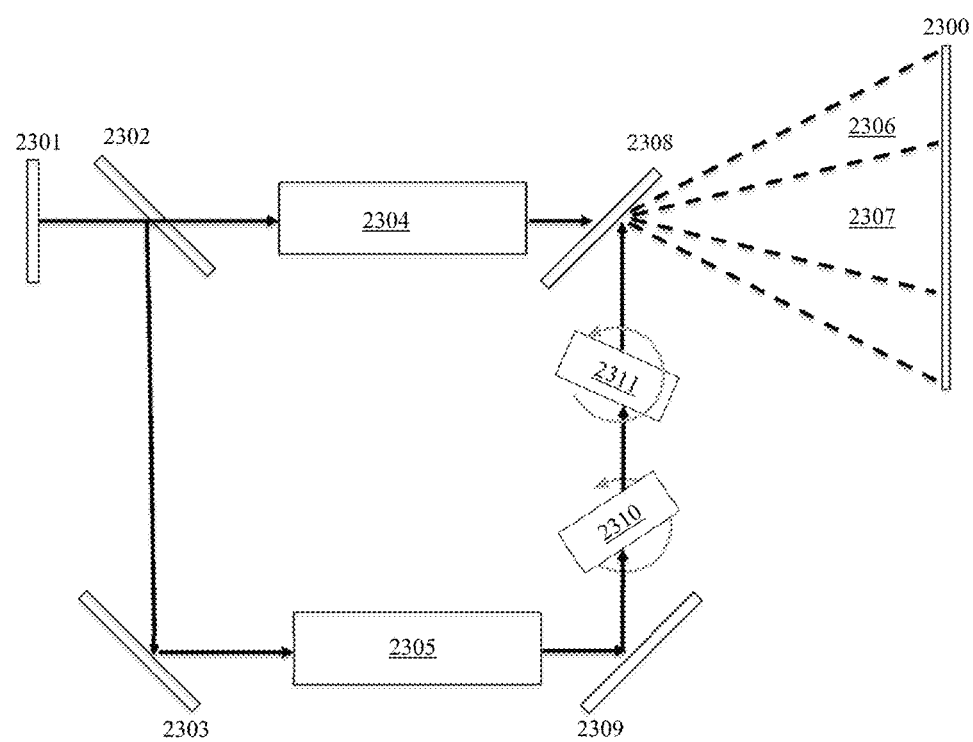
FIG. 5E illustrates an embodiment using optical slab elements.
Figure 5F:
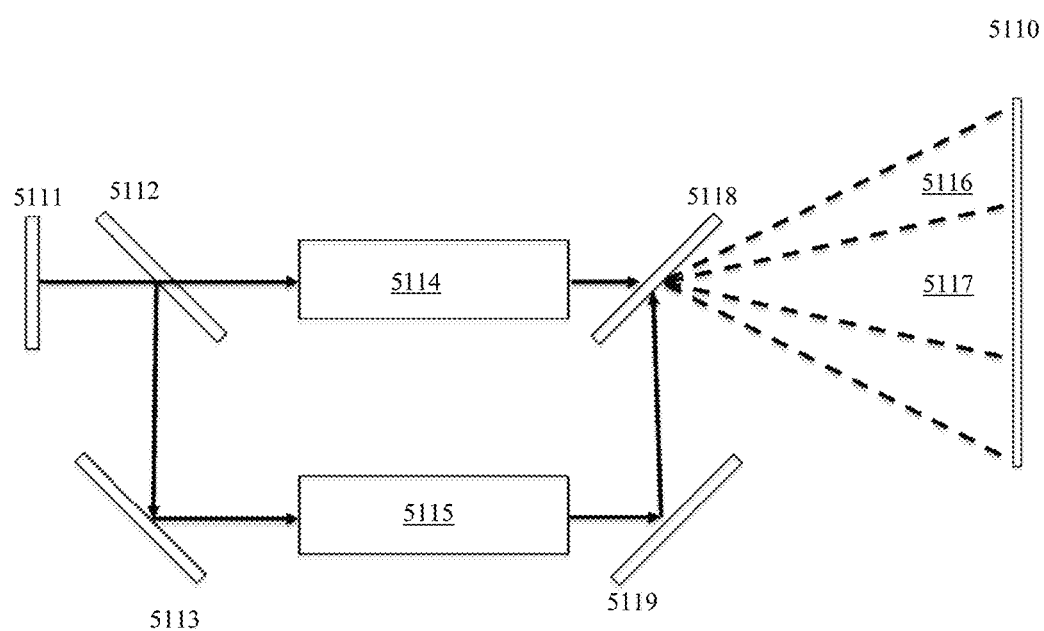
FIG. 5F is a hardware flow of the light through the optical elements in a slightly more complex embodiment, using a screen.

Looking to FIG. 5F, the optical elements are shown. The projector 5111 sends the projection beam to a beam splitter or a rotating mirror 5112, that sends projection beams to the wide beam optics 5114 and to a mirror 5113 that redirects the projection beam to the narrow beam optics 5115. From the narrow beam optics 5115, the beam is sent to a mirror 5119 and then to a beam combiner 5118 (beam splitter) to combine with the output of the wide beam optics 5114. From the beam combiner 5118, the wide beam 5116 and the narrow beam 5117, are sent as a combined projection beam to the viewer's retina or the screen 5110. In case of using a beam splitter instead of a rotating mirror as the steering element, each beam each frame must be blocked or let to pass accordingly before, inside or after the optical element 5114, 5115 with an optical or mechanical shutter such as an LCD shutter in order to prevent 5114 and 5115 from receiving the same beam of every frame instead of the different beams of different consecutive frames. This is of course not needed if a polarizer beam splitter is used and the polarization of the image can be controlled each frame before it reaches the beam splitter, such as with a switchable liquid crystal polarization rotator.

Figure 5G:
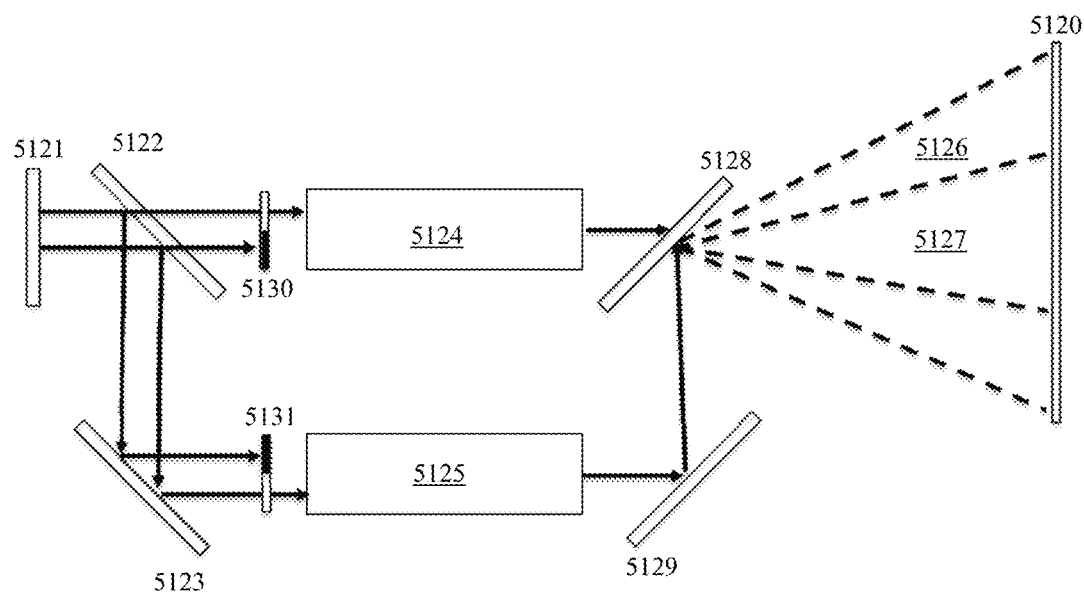
FIG. 5G is a hardware flow of the light through the optical elements as in the previous drawing with an optical mask, using a screen.

One difference between FIGS. 5F and 5G is that projection beams are illustrated as two lines rather than one before reaching the optical masking elements. This is done to illustrate how the projection beam is masked/cropped by the optical masking elements 5130, 5131.

Looking to FIG. 5G, the optical elements are shown, for processing the image structure in FIG. 3. The projector 5121 sends the projection beam to a beam splitter 5122, that sends two identical projection beams, one to a mirror 5123 first, to a stencil (a physical barrier to hide part of the image) 5130, 5131. The stencils must be on an image plane to create a sharp cut, so can also be inside the optics (5124 and 5125), or after the optics.

The beams leave from the stencils 5130, 5131 to the wide beam optics 5124 and to the narrow beam optics 5125. From the narrow beam optics 5125, the beam is sent to a mirror 5129 and then to a beam combiner 5128 (beam splitter) to combine with the output of the wide beam optics 5124. From the beam combiner 5128, the wide beam 5126 and the narrow beam 5127, are sent as a combined projection beam to the viewer's retina or screen 5120.

Figure 5H:
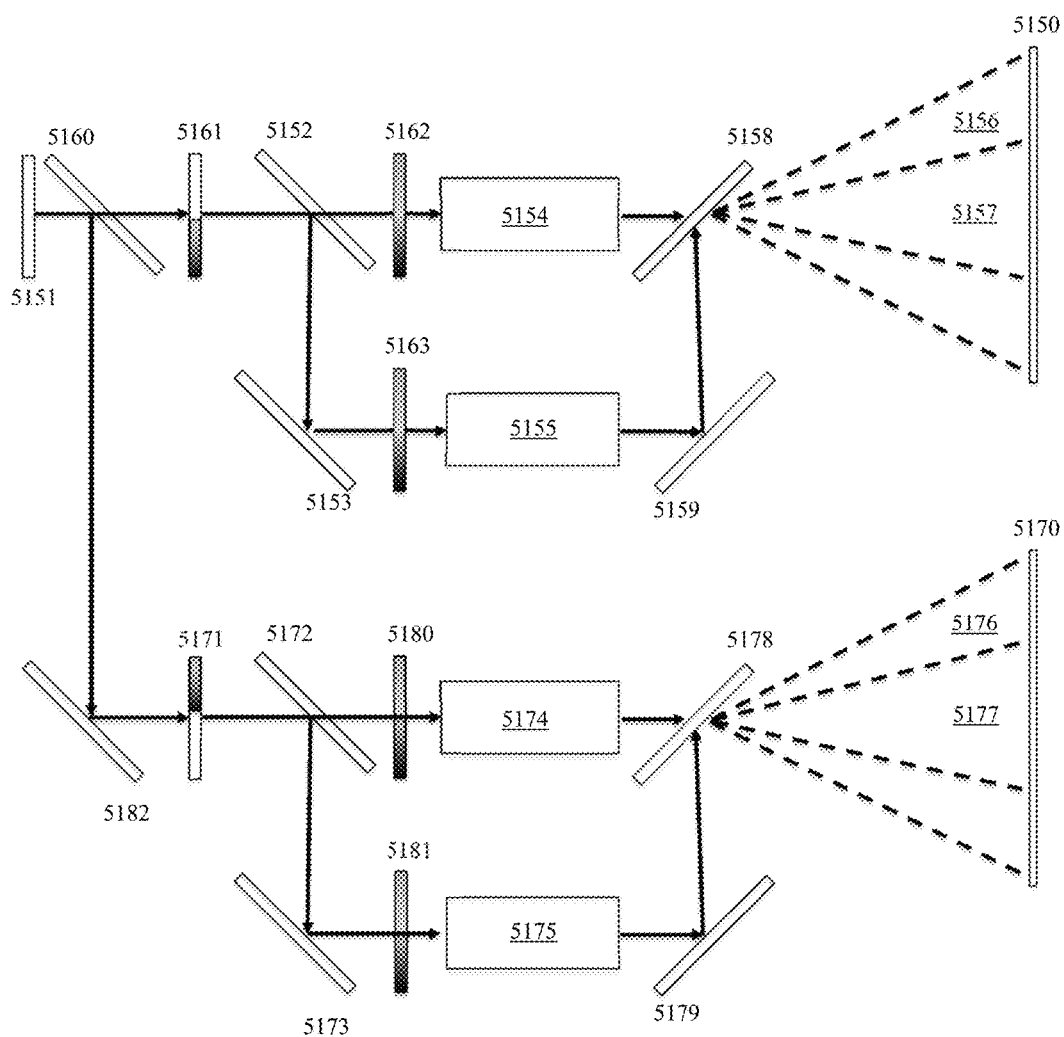
FIG. 5H is a hardware flow of the light through the optical elements as in the FIG. 5F for each screen in a head-mounted display.

Looking to FIG. 5H we see a head-mounted display embodiment which uses a single projector 5151 for both screens (for both eyes). First the resolution of the microdisplay or display is split between eyes, then each frame is used only for one projection (large or small image). For example with a 240 Hz DLP projector this provides 120 Hz refresh rate per image per screen.

The projector 5151 sends the beam to a beam splitter 5160 that sends two identical beams, one reflected from a mirror 5182 first, to the stencils 5161, 5171 that mask off the portion of the image not destined for the specific eye. In one embodiment, the stencils 5161, 5171 could be shutters such as an LCD shutter or LCD pi-cell, so each frame will be sent only to one optics and blocked for the rest of the optics 5154, 5155, 5174, 5175, such as in the instance seen in FIG. 2. In another embodiment, the stencils 5161, 5171 could be removed so each frame the whole image will be sent only to one optics and blocked for the rest of the optics 5154, 5155, 5174, 5175, such as in the instance seen in FIG. 2. For example with a 240 Hz DLP projector this provides 60 Hz refresh rate per image per eye.

The left stencil (top in the diagram) 5161 sends the beam to a second beam splitter 5152 which send two identical beams, one to a mirror 5153 first, to the two LCD shutters 5162, 5163 for the FIG. 2 embodiment. The LCD shutters 5162, 5163 could be replaced with stencils (a physical barrier to hide part of the projection beam) for the FIG. 3 embodiment. The stencils must be on an image plane to create a sharp cut, so can also be inside the optics (5154 and 5155), or after the optics.

The beams leave from the shutters (or stencils) 5162, 5163 to the wide beam optics 5154 and narrow beam optics 5155. From the narrow beam optics 5155, the beam is sent to a mirror 5159 and then to a beam combiner 5158 (beam splitter) to combine with the output of the wide beam optics 5154. From the beam combiner 5158, the wide beam 5156 and the narrow beam 5157, are sent as a combined beam to the screen 5150 or viewer's retina.

The right stencil (bottom in the diagram) 5171 sends the beam to a second beam splitter 5172 which sends two identical beams, one to a mirror 5173 first, to the two LCD shutters 5180, 5181 for the FIG. 2 embodiment. The LCD shutters 5180, 5181 could be replaced with stencils (a physical barrier to hide part of the projection beam) for the FIG. 3 embodiment. This has to be in an image plane to create a sharp cut, so can also be inside the optics (5174 and 5175), or after the optics.

The beams leave from the LCD shutters (or stencils) 5180, 5181 to the wide beam optics 5174 and narrow beam optics 5175. From the narrow beam optics 5175, the beam is sent to a mirror 5179 and then to a beam combiner 5178 (beam splitter) to combine with the output of the wide beam optics 5174. From the beam combiner 5178, the wide beam 5176 and the narrow beam 5177, are sent as a combined beam to the screen 5170 or viewer's retina.

Due to persistence of vision with the method in FIG. 2 and masking with the method in FIG. 3 the two parts appear as one uniform projected image 604 in FIG. 6B.

In FIG. 6A, the illustration shows rectangles representing individual pixels 601. FIG. 6B shows an illustration with individual pixels displaying an actual image 604.

Since the small high resolution part 603, 606 in the final projected image 601, 604 can be smaller than it could be without the use of these methods, the variable-resolution screen method and apparatus described here allows to achieve more resolution visible in one or more parts of the projected image than is possible with the projector when used without the methods described here.

This allows to achieve a variable-resolution screen, such as a head-mounted display screen which uses only one projector or one per eye with a high pixel or scanline density in the center of the field of view of the viewer and less in the periphery.

Optionally, by adding eye tracking via, but not limited to, gaze tracking cameras or electrodes, the small high resolution part 603, 606 can be positioned on the final projected image 601, 604 on the large low resolution part 602, 605 where the viewer's foveal view is at any given point in time. This allows to always have more pixels or scanlines concentrated in the foveal and optionally also in the near peripheral view of the viewer at any given point in time.

Optionally the positioning of the large low resolution part 602, 605 can be achieved the same way the positioning of the small high resolution part 603, 606, for example to have pixels only in the field of view of the viewer's eye and not the total field of view of the viewer which takes into account eye rotations.

There can also be more than two parts, such as three, one for the foveal view, one for near peripheral and one for far peripheral and they can be combined and optionally positioned the same way as mentioned above.

Those skilled in the art will understand that the order of some elements can be changed and more can be added, such as steering both large and small images together after they are optically combined, or adding more elements for creating more small or large parts on the final projected image.
Shifting with Optical Slabs or Mirrors a High Resolution Small Image or Narrow Projection Beam Over a Low Resolution Large Image or Wide Projection Beam In another embodiment, a variable-resolution screen is achieved by shifting/offsetting a small and high resolution image or projection beam over a large and low resolution image or projection beam with optical slabs or mirrors.

To achieve a variable-resolution screen a single display technology such as a microdisplay or display or a single video projector such as a single illuminated microdisplay, display, LBS (laser beam steering) projector or other type of video projector (from now on referred to as "projector") 401, 411, 501, 511, 521, 551, 2301, 5111, 5121, 5151 is operated at fast refresh rates. In FIG. 2, each consecutive frame (frame n+1) the microdisplay, display or projector is used to either display or project a small high resolution part 204 or parts of the final image 205 or a large low resolution part 203 or parts of the final image 205 by sharing the refresh rate of the frames 201, 202 and final image 205 between the latter's two or more parts 203, 204. Persistence of vision blends the two parts 203, 204 into one final image 205.

FIG. 3 shows an alternative embodiment, to achieve a variable-resolution screen a single display technology such as a microdisplay, display or a single video projector such as a single illuminated microdisplay, display, LBS (Laser beam steering) projector or other type of video projector (from now on referred to as "projector") is optically split into two or more parts 301, 302. This method allows a small high resolution part or parts 304 to use more pixels on the final image 305 by sacrificing the resolution of a large low resolution part 303 or parts.

The two methods can also be combined to allow to create more parts on the final image or to allow to create two or more final images by sharing both the resolution and refresh rate of the microdisplay, display or projector between the parts, such as for using a single microdisplay, display or projector to create final images for both eyes in a head-mounted display.

In FIG. 3, a single 16:9 aspect ratio microdisplay or display is split into two parts, for example 1920×1080 pixel microdisplay or display split into a small 1080×1080 pixel high resolution part 301 and a large 840×1080 pixel low resolution part 302 (the latter may then be optically flipped 90 degrees for a better aspect ratio).

Using optical or optical and mechanical and also optionally digital methods, the parts 301 and 302 can be resized and superimposed on each other and the large low resolution part 303 can be masked where the small high resolution part 304 is and where they overlap.

The masking can further be made more seamless by blending the edges optically or digitally by making the transition less abrupt with a digital resolution falloff in the high resolution small image 304 or narrow beam or dimming the pixels with a falloff on both images or beams.

The brightness levels between the two parts may be balanced optically such as with neutral density filters or digitally.

Look to FIGS. 4A and 4B. To be able to use the same microdisplay, display or projector 401, 411 for each part which have a different size and position on the final image 405, with the first method from FIG. 2, the image of the microdisplay or display or the beam of the projector is steered with a steering element optomechanically or optically, such as, but not limited to, a rotating mirror or beam splitter 402, 412 and an optional mirror 413, only to one of two optical elements 403, 404, 414, 415 for each frame. In case of using a beam splitter instead of a rotating mirror as the steering element, each image or beam each frame must be blocked or let to pass accordingly before, inside or after the optical element 403, 404, 414, 415 with an optical or mechanical shutter such as an LCD shutter in order to prevent 403, 414 and 404, 415 from receiving the same image or beam of every frame instead of the different images or beams of different consecutive frames. This is of course not needed if a polarizer beam splitter is used and the polarization of the beam can be controlled each frame before it reaches the beam splitter, such as with a switchable liquid crystal polarization rotator.

To be able to use the same microdisplay, display or projector 401, 411 for each part which have a different size and position on the final image 405 with the second method from FIG. 3, the image of the microdisplay or display or the beam of the projector 401, 411 is steered with a steering element such as, but not limited to, a beam splitter or a mirror on an image plane 402, 412 and an optional mirror 413, to two optical elements 403, 404, 414, 415. In case of using a beam splitter and not a mirror on an image plane, each image or beam is then masked accordingly before, inside or after the optical element 403, 404, 414, 415 with an optical masking element such as a stencil. The mirror or stencil must be on an image plane to create a sharp cut.

Steering element 402, 412 may be, but is not limited to, a mirror, mirrors, beam splitter and optical or mechanical shutter or shutters combined with one of the above.

The optical element 403, 404, 414, 415 may be, but is not limited to, one of the following, or a combination of: lenses, mirrors, prisms, free-form mirrors.

One of the optical elements 404, 415 may create a small image or narrow beam 417 and the other optical element 403, 414 a comparably large image or wide beam 416.

In the embodiment in FIGS. 5A and 5B, the positioning of the small image or narrow beam can be achieved with, but not limited to one or more of the following: optical slabs or mirrors 506, 519, 529, 559, 579, 2310, 2311, 5119, 5129, 5159, 5179.

The two images or beams are optically combined, such as with a beam splitter and viewed directly, or through, but not limited to, an eyepiece or waveguide.

Due to persistence of vision with the method in FIG. 2 and masking with the method in FIG. 3 the two parts appear as one uniform image 604 in FIG. 6B.

Looking to FIG. 5E, we see a variant of FIG. 5B or 5F with two tilting optical slabs 2310 and 2311. The microdisplay, display or projector 2301 creates the image or beam and sends the image or beam through a beam splitter or a rotating mirror 2302. Two identical images or beams are sent from the beam splitter 2302. One image or beam is sent through the low resolution, large image or wide beam optics 2304, where the high resolution portion is masked off in case of using the method in FIG. 3, and then to the beam splitter 2308, used here as a beam combiner. The other image or beam is sent from the beam splitter 2302 to a mirror 2303 to the high resolution, small image or narrow beam optics 2305, where the low resolution image is masked off in case of using the method in FIG. 3. From the small image or narrow beam optics 2305, the image or beam is reflected off a mirror 2309 to two beam steering elements 2310, 2311, to offset the small image or narrow beam in the axis (after it will be combined with the beam combiner 2308) of the large image or wide beam. In this illustration the beam steering elements are two thick optical slabs 2310, 2311 that rotate in X and Y axis respectively to offset the image or beam in these two respective axis. The optical slabs 2310, 2311 may each be substituted with a single mirror that rotates in both axis or two rotating/tilting mirrors, to name a few possible alternative embodiments. From the second optical slab 2311, the shifted image or beam travels to the beam splitter 2308, used here as a beam combiner. From the beam splitter 2308, the low resolution, large image or wide beam 2306 and the high resolution, small image or narrow beam 2307 travel to the screen 2300 or viewer's retina.

In case of using a beam splitter instead of a rotating mirror as the steering element 2302 and using the method in FIG. 2, each image each frame must be blocked or let to pass accordingly before, inside or after the optical element 2304, 2305 with an optical or mechanical shutter such as an LCD shutter in order to prevent 2304 and 2305 from receiving the same image of every frame instead of the different images of different consecutive frames. This is of course not needed if a polarizer beam splitter is used and the polarization of the image can be controlled each frame before it reaches the beam splitter, such as with a switchable liquid crystal polarization rotator.

In FIG. 6A, the illustration shows rectangles representing individual pixels 601. FIG. 6B shows an illustration with individual pixels displaying an actual image 604.

With tilting/rotating mirrors and rotating wedge (Risley) prisms, the projection beam or image is steered and gets a perspective distortion, as seen in FIG. 7B, and some optical aberrations which get progressively worse as the image or beam is steered farther away from the center. To fix the perspective distortion the image 702 must be pre-distorted digitally which reduces the possible size of the high resolution small image and the number of utilized pixels significantly.

Also, if there is any inaccuracy or precision issues during positioning, it is visible as a very apparent distortion and seam as the digital distortion and image or projection beam do not match the current positioning by the mirror, prism or other tilting element, as seen in FIG. 8A.

FIG. 7A is an original image 701, and FIG. 7B is a perspective distorted image 702.

In FIG. 8A, the correct image 801 is seen. In the image on the right 802 (FIG. 8B) the digital imaging and image positioning and distortion mismatch which causes distortion and seam between the two image parts is seen.

With shifting/offsetting the image or beam instead, these issues do not happen.

The beam or image can be shifted by, but not limited to, two tilting/rotating optical slabs, one for each axis, two dual axis tilting/rotating mirrors such as Optotune™ MR-15-30-PS-25x25D or four tilting/rotating mirrors (two per axis).

In FIGS. 9A-D, an optical slab 902 is a glass slab or a plastic polymer slab clear in the visible spectrum which allows to shift/offset an image or projection beam 903.

Both an image as well as a projection beam 903 may be shifted with this method. The latter allows to have the slabs 902 relatively small which can direct the projection beam to projection optics which can produce a large projected image not requiring much more magnification by the eyepiece lens, waveguide or similar optics in a head-mounted display device.

However, an image may be shifted by this method as well when the magnification can be performed by the eyepiece optics, limited amount of shifting is needed or limited amount of magnification is needed by the eyepiece lens, waveguide or similar optics.

Figure 9A:
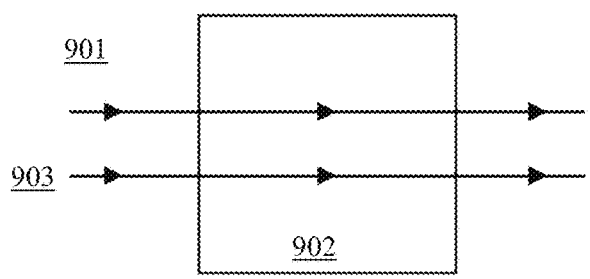
FIG. 9A shows light going through an optical slab.
Figure 9B:
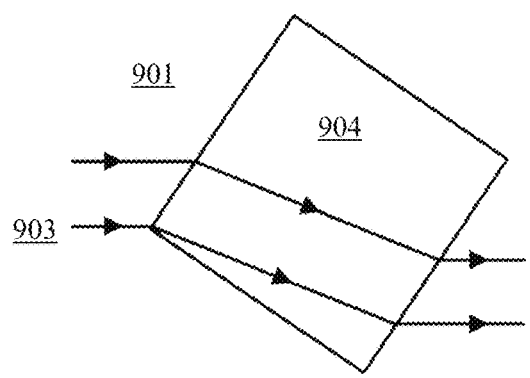
FIG. 9B shows light going through an optical slab at an angle.

In FIG. 9B we see a 20×20×20 mm PMMA (Poly(methyl methacrylate)) polymer optical slab 902 with a collimated 5 mm wide 638 nm wavelength beam 903 passing through it and being shifted. In this example the slab can tilt +34 degrees (the range is ±34 degrees) and offset the beam by up to 8.04 mm. Considering a situation where such a beam later goes through a projection lens and the 5 mm beam is meant to cover 20 degrees of the field of view when looking through the eyepiece or waveguide, a 16.08 mm shift would allow to move the high resolution image which the beam contains by over 64 degrees or more which is more than the average human can comfortably rotate their eyes.

In FIG. 9B the optical slab 904 is tilted −34 degrees to offset the beam 903 8.04 mm downwards.

Two of such slabs 902, 904 will be needed, as seen in FIG. 5E, rotating in different axis to allow to shift the beam 903 in both axis, or having an optical component such as a Dove prism or an identical mirror assembly between two slabs 902, 904 allowing them to rotate in the same axis.

The illustration is just for example purposes and different materials and sizes for the slabs 902, 904, dimensions for the beams 903 and rotation ranges are possible.

Slight dispersion of an RGB image or projection beam 903 caused by the optical slab 902, 904 can be compensated for by digitally offsetting each color channel by several pixels accordingly. Since offsetting will need to be done only to one or two color channels with higher refractive index, one or two color channels won't be able to reach the same offset on the edges of the image or projection beam 903 which may require to digitally or optically crop the image or projection beam 903 slightly on the edges so the pixels in each color channel can be offset as much as is required to undo the separation of the color channels caused by dispersion. This loss of pixels on the edges is still negligible compared to loss of pixels/detail due to correction of a perspective distortion from previous embodiments.

With the above example at the extreme ±34 degree slab tilt the angle of refraction at 445 nm wavelength is ±21.9 degrees and at 638 nm wavelength is ±22.1 degrees. This results in 0.06 mm dispersion between the red and blue color channel of the image or projection beam 903. Assuming the resolution of this 5 mm wide image or projection beam 903 is 1080 pixels by 1080 pixels, this amounts to 0.06×1080/ 5=12.96 pixels. Sacrificing 13 pixels on each edge of the beam 903 will allow to offset the color channels digitally to undo the effect of dispersion at any angle.

Specifically looking to FIG. 9A, we see the beam 903 moving through the air 901 to the slab 902. Since the slab 902 is perpendicular to the beam 903, the beam 903 goes straight through the slab 902.

In FIG. 9B, the slab 904 is tilted −34 degrees, causing the beam 903 to be offset 8.04 mm downwards.

Figure 9C:
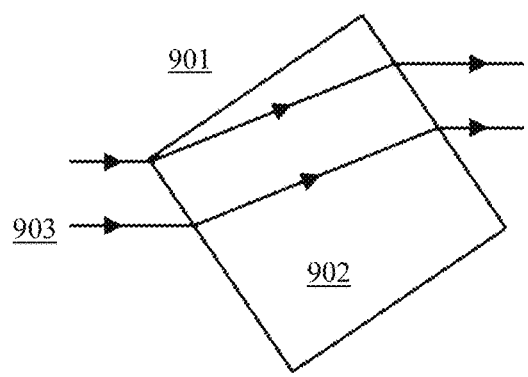
FIG. 9C shows light going through an optical slab at a different angle.

In FIG. 9C, the slab 902 is tilted +34 degrees, causing the beam 903 to be offset 8.04 mm upwards.

Figure 9D:
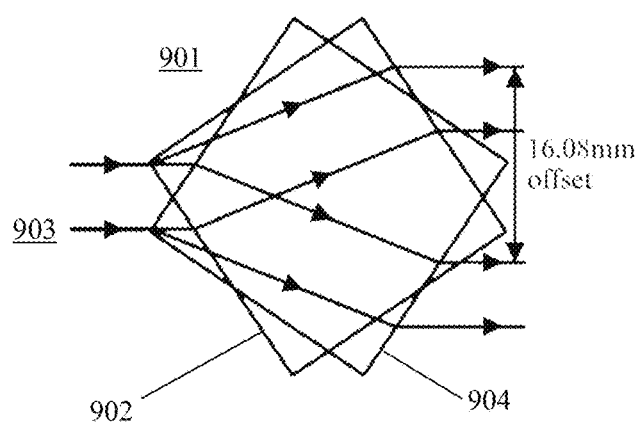
FIG. 9D shows a superimposition of light going through the same optical slab at two opposite maximum angles.

In FIG. 9D, there are two views of a single slab 902, 904 superimposed over each other to illustrate how much the beam offsets from one angle to the other. The slab view 904 is tilted −34 degrees, causing the beam 903 to be offset 8.04 mm downwards while slab view 902 is tilted +34 causing the beam 903 to be offset 8.04 mm upwards. Thus the beam 903 may be offset up and down, creating images or beams at most 16.08 mm apart.

As seen in FIG. 10A and FIG. 10B, the slabs 902, 904 can also be swapped with 2d mirrors (dual axis tilting/rotating mirrors such as Optotune™ MR-15-30-PS-25x25D) or two mirrors 1001, 1002 or 1003, 1004. This is a savings in cost traded off with bigger space requirements. On the other hand, dispersion is not an issue with mirrors.

In FIG. 10A the mirrors are tilted at 45 degrees 1001, 1002 and 40 degrees 1003, 1004 in FIG. 10B.

Figure 11:
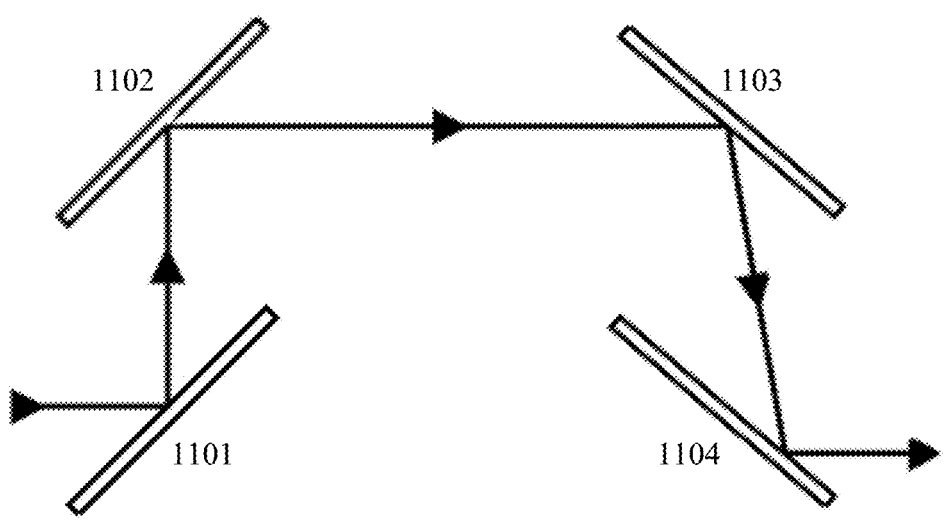
FIG. 11 illustrates offsetting the image or beam with a set of four mirrors.

Two 2d mirrors rotating in two axis or four mirrors 1101, 1102, 1103, 1104 are required to shift the beam or image in two axis as seen in FIG. 11.

In FIG. 11, both mirrors 1101, 1102 have a top-down view purely for illustrative purposes, the second set of mirrors 1103, 1104 are in another axis.

Figure 12:
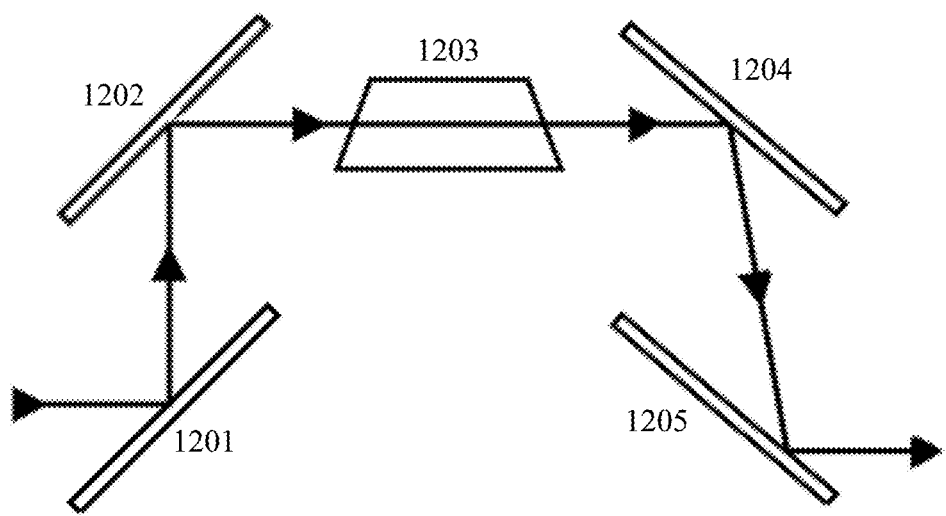
FIG. 12 illustrates offsetting the image or beam with a set of Dove prism and four mirrors.

FIG. 12 shows another embodiment. Either the second set of mirrors 1204, 1205 can be flipped and rotated in another axis or to save space in one axis a Dove prism 1203 or an equivalent mirror assembly may be placed between the two 2d mirrors or mirror pairs 1201, 1202 and 1204, 1205 to flip the axis of the offset performed by the previous set and have the mirrors and the components which shift/offset them in the same axis.

In FIG. 12 we see the path the ray travels when using the Dove prism 1203 (The Dove prism proportions and angle are not accurate in this drawing, nor is the path the ray travels inside the Dove prism itself).

Since the smaller high resolution part in the final image can be smaller than it could be without the use of these methods, the variable-resolution screen method and apparatus described here allows to achieve more resolution visible in one or more parts of the final image than is possible with the display, microdisplay or projector when used without the method described here.

This allows to achieve a variable-resolution screen, such as a head-mounted display screen which uses as little as only one microdisplay, display or projector or one per eye with a high pixel or scanline density in the center of the field of view of the viewer and less in the periphery.

By adding eye tracking via, but not limited to, gaze tracking cameras or electrodes, the smaller high resolution part can be moved on the final image or screen on the bigger low resolution part where the viewer's foveal view is at any given point in time. This allows to always have more pixels or scanlines concentrated in the foveal and optionally also in the near peripheral view of the viewer at any given point in time.

Optionally the positioning of the bigger low resolution part can be achieved the same way the positioning of the smaller high resolution part, for example to have pixels only in the field of view of the viewer's eye and not the total field of view of the viewer which takes into account eye rotations.

There can also be more than two parts, such as three, one for the foveal view, one for near peripheral and one for far peripheral and they can be combined the same way as mentioned above.

Those skilled in the art will understand that the order of some elements in the diagrams can be changed and more can be added, such as shifting both large and small images or beams together after they are optically combined, or adding more elements for creating more smaller or bigger parts on the final image.

Variable-Resolution Screen with No Moving Parts

In a further embodiment, a variable-resolution screen is achieved by creating and digitally and optically positioning a small and high resolution image or projection over a large low resolution image or projection with no mechanically moving parts.

The image source for the at least one large low resolution part 201 and at least one small high resolution part 202 can be the same microdisplay, display or projector with consecutive frames (frame n and frame n+1) distributed between the two or more parts 203, 204 of the final image or beam (see FIG. 2). Or the parts of the images of the microdisplay, display or projector could be optically split into two 301, 302 or more and allocated between the at least one large low resolution part 303 and at least one small high resolution part 304, as in FIG. 3. Alternatively, the at least one large low resolution part and at least one small high resolution part can have a different microdisplay, display or projector as image source each as in FIG. 13.

See FIG. 3, where a single 16:9 aspect ratio microdisplay or display is split into two parts, for example 1920×1080 pixel microdisplay or display split into a small 1080×1080 pixel high resolution part 301 and a large 840×1080 pixel low resolution part 302 (the latter may then be optically flipped 90 degrees for a better aspect ratio).

The lack of mechanically moving parts provides several advantages:

First, eliminating moving parts eliminates the sensitivity to vibration, misalignment, mechanical failure, audible noise or any other issues associated with using mechanically moving parts.

Second, repositioning of the small high resolution part can take as low as few microseconds to few milliseconds, based on the speed of the optical masking element used as described below. By contrast it is difficult to get actuators to rotate a mirror, prism or slab as fast as the saccadic movement of the human eye while keeping such a motor as small as possible for a wearable device.

Third, positioning takes equal amounts of time irrespective of the new position the small high resolution part has to be positioned to.

At first, an image or projection beam is optically duplicated across the whole or most of the screen or the viewer's retina or part of the screen the human eye can rotate and focus at.

This can be achieved by, for example, the use of lens arrays. For illustrative and purposes of showing an example a single or double sided lens array is used, however a multi-element lens and/or lens array setup is required to reduce optical aberrations in the duplicated images or video projections.

Figure 13:
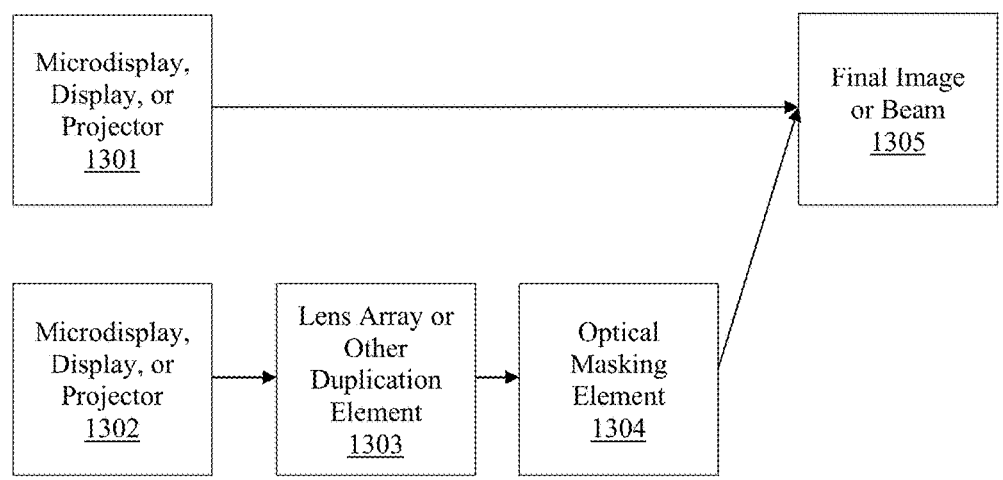
FIG. 13 shows a functional flow of light through the optical functions in a lens array embodiment.

FIG. 13 shows a two microdisplays, displays or projectors 1301, 1302 embodiment using a lens array. The large image or wide beam is created by the first microdisplay, display or projector 1301 and sent directly (or through a large image or wide beam optics) to the final image 1305. The second microdisplay, display or projector 1302 creates the small image or narrow beam, sending it to the lens array (or other duplication element) 1303 and then to an optical masking element 1304 to mask off (hide) the duplicates in the area outside of the one duplicate image to be shown. The image or beam then proceeds to the final image 1305 where it is combined with the large image or wide beam from the first microdisplay, display or projector 1301.

Figure 14:
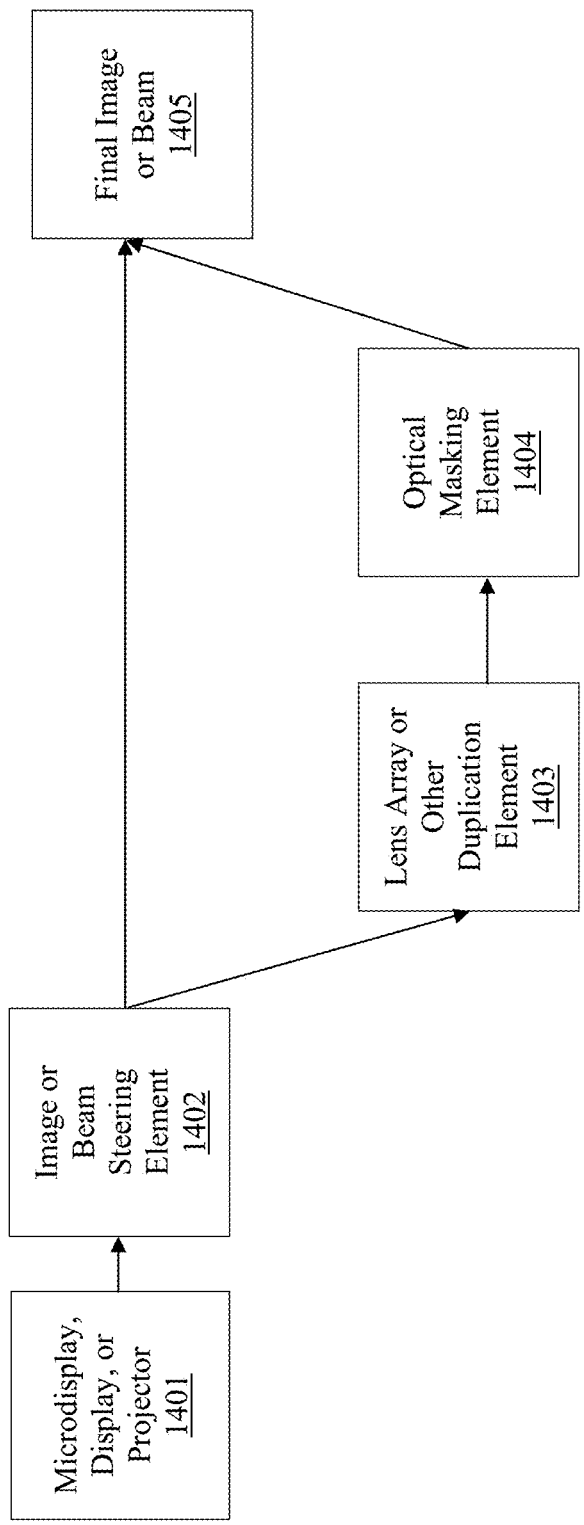
FIG. 14 shows a functional flow of light through the optical functions in a second lens array embodiment.

FIG. 14 shows a similar embodiment, using a single microdisplay, display or projector 1401. The image or beam proceeds from the microdisplay, display or projector 1401 to an image or beam steering element 1402. The steering element 1402 splits the image or beam, with the large image portion of the final image or beam sent directly (or through a large image or wide beam optics) to the final image 1405 (in some embodiments, such as in FIG. 3, the image is masked to extract small and large image portions accordingly first). The small image portion of the final image or beam is sent to the lens array (or other duplication element) 1403, and then to the optical masking element 1404 to mask off (hide) the duplicates in the area outside of the one duplicate image to be shown. This small image or narrow beam is then combined with the large image or wide beam from the steering element 1402 to form the final image 1405.

Figure 15:
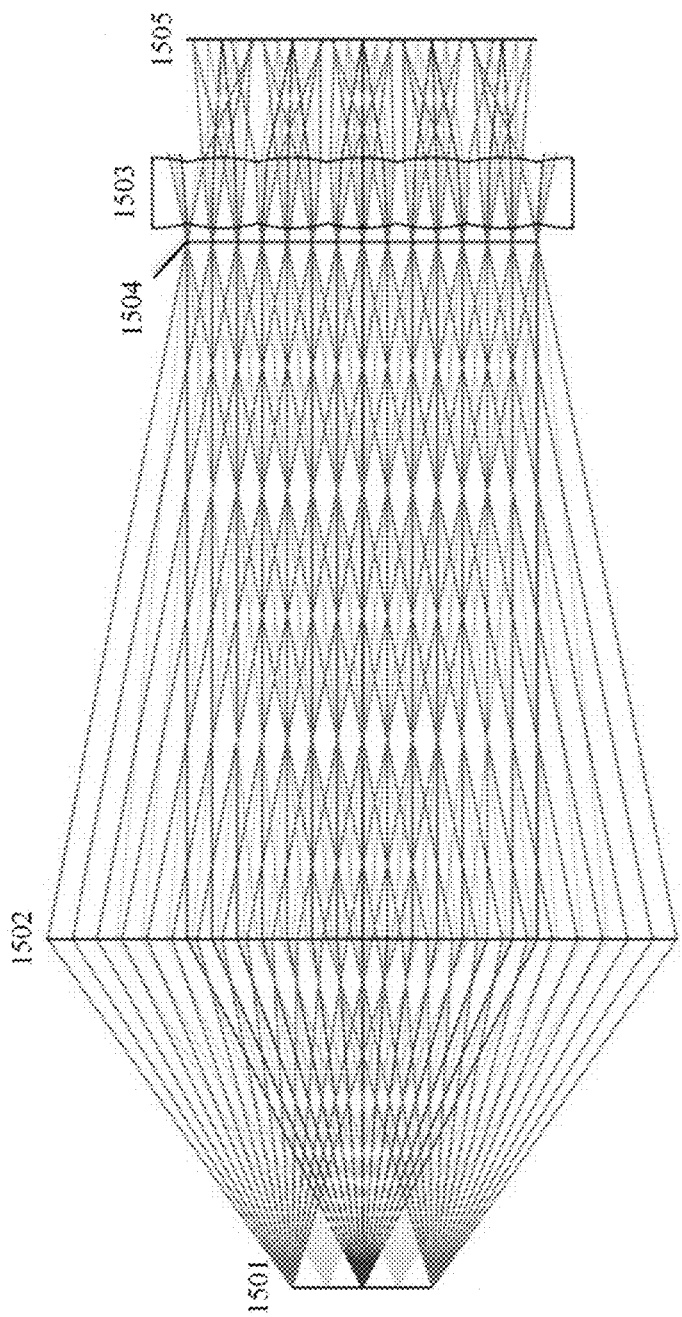
FIG. 15 shows the light flow through the elements of one lens array embodiment.

FIG. 15 shows the simplest setup of how display, microdisplay or projection beam can be duplicated this way and FIGS. 16A and 16B show the simulated result.

In FIG. 15, the image source (display, microdisplay or projector) 1501 sends the image to a lens 1502 which sends it to the aperture stop 1504. The image or beam then proceeds to the lens array 1503 and then to the screen 1505 or viewer's retina.

FIGS. 16A and 16B show the simulated result. FIG. 16A is the original image from the display, microdisplay or projector 1601 and FIG. 16B is the resulting image on the screen or viewer's retina 1602.

Figure 17A:
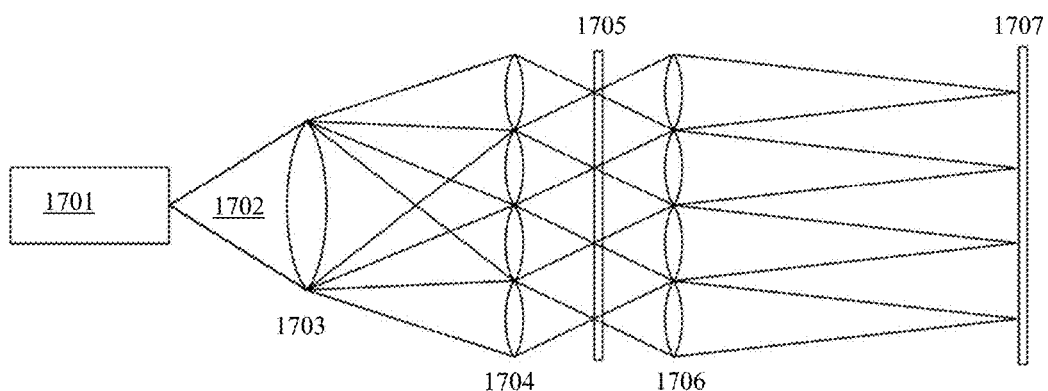
FIG. 17A shows an embodiment using a matched set of lens arrays and an optical masking element.

FIG. 17A shows a simple setup with one possible position of the optical masking element. 1701 is a microdisplay, display or projector, 1702 is the light cone (beam) of a single pixel from 1701. 1703 is a simplified illustration of a multi-element lens. 1704 is the first lens array which focuses the pixel light cones (beams) to pixels on a LCD microdisplay optical masking element 1705 on an intermediate image plane and 1706 is the second lens array which again focuses the pixel light cones on the final image plane on a projection screen 1707 or the viewer's retina. The second lens array 1706 can also be replaced with other optics such as an ordinary projection lens or eyepiece lens.

Figure 17B:
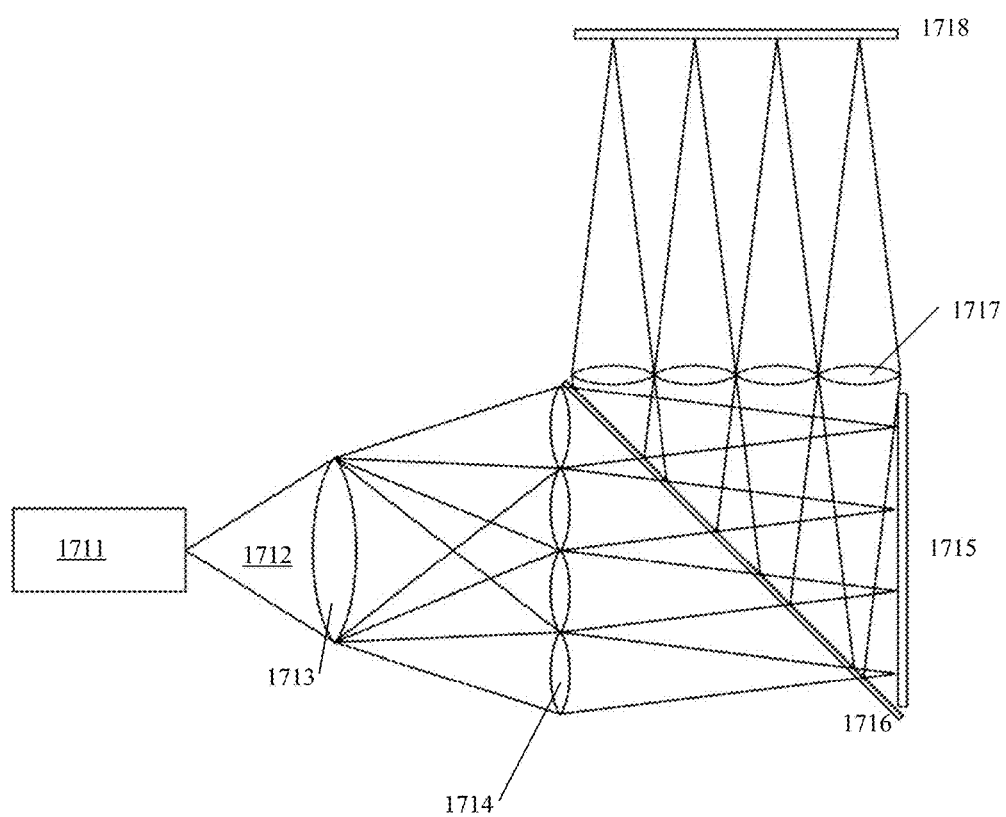
FIG. 17B demonstrates reflective microdisplay used for the optical masking element.

FIG. 17B shows a reflective microdisplay such as LCoS or DLP used for the optical masking element. 1711 is a microdisplay, display or projector generating the image or beam, 1712 is a light cone (beam) of a single pixel from 1711, 1713 is a simplified illustration of a multi-element lens, 1714 is the first lens array which focuses the pixel light cones (beams) to pixels on a LCoS microdisplay optical masking element 1715 on an intermediate image plane and 1717 is the second lens array which again focuses the pixel light cones (beams) on the final image plane on a projection screen 1718 or the viewer's retina. A polarizer beam splitter or a PBS (polarizer beam splitter) cube 1716 is used to redirect the image or beam reflected off the LCoS microdisplay optical masking element 1715 90 degrees to the side rather than back to the first lens array. The second lens array 1717 can also be replaced with other optics such as an ordinary projection lens or eyepiece lens. With DLP microdisplay a TIR or RTIR (total internal reflection) prism can be used in place of the polarizer beam splitter or PBS (polarizer beam splitter) cube 1716.

Figure 17C:
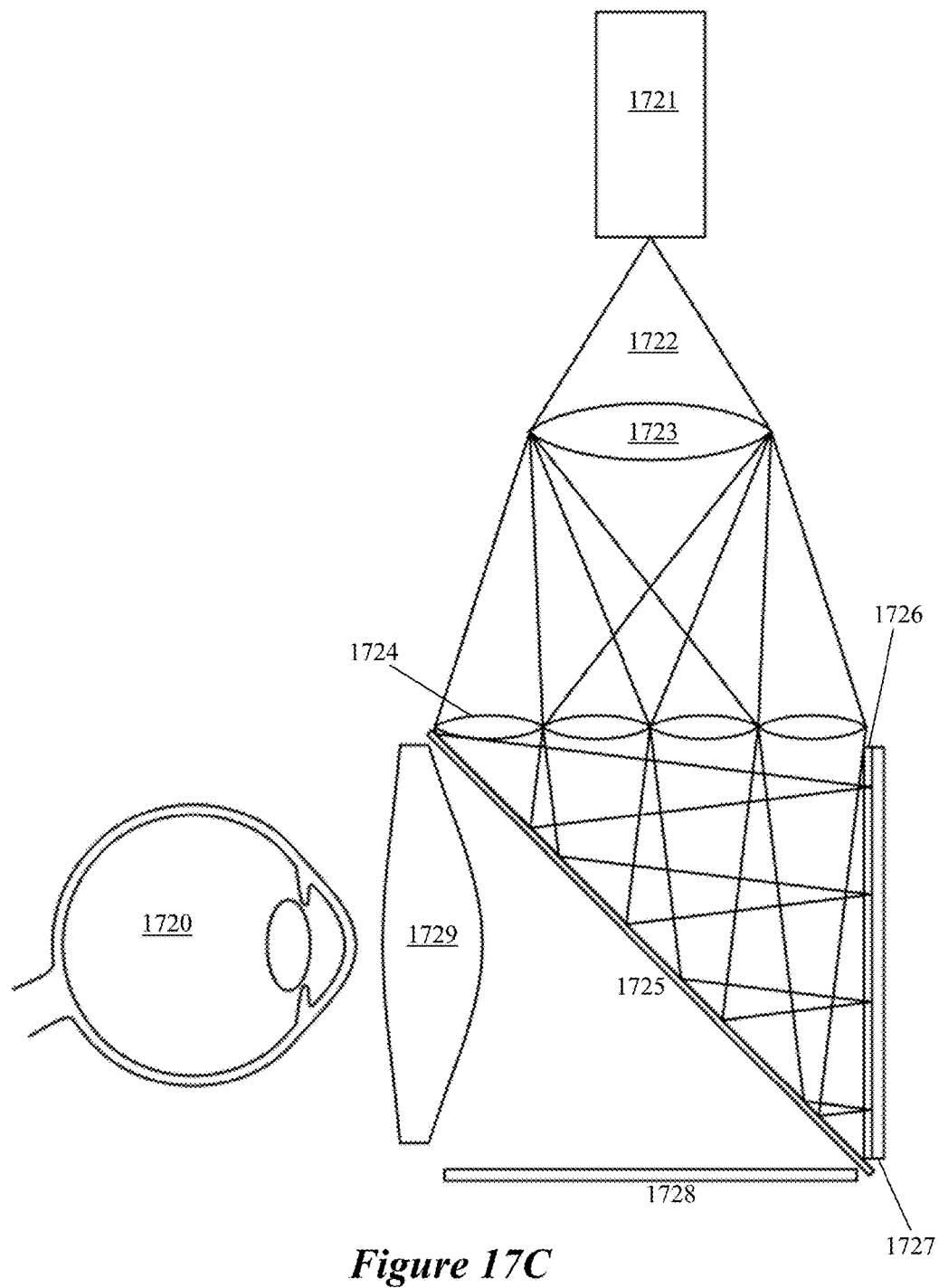
FIG. 17C shows the use of a display, such as an LCD display with its reflective and backlight layers removed as the optical masking element.

FIG. 17C shows that it is also possible to use a display, not microdisplay, such as an LCD display with its reflective and backlight layers removed as the optical masking element. 1721 is a microdisplay, display or projector generating the image or beam, 1722 is a light cone (beam) of a single pixel from 1721, 1723 is a simplified illustration of a multi-element lens, 1724 is the lens array which focuses the pixel light cones (beams) to pixels on a screen 1727 on an image plane behind a LCD display optical masking element 1726 by reflecting the beam with a beam splitter 1725. The image from second display 1728 also reflects from the beam splitter thus both the second display and the screen are seen by the eye 1720 directly or through an eyepiece or waveguide 1729. Here the screen 1727 is used to display the small high resolution image and the display 1728 is used to display the large low resolution image of the final combined image combined by the beam splitter 1725.

Figure 17D:
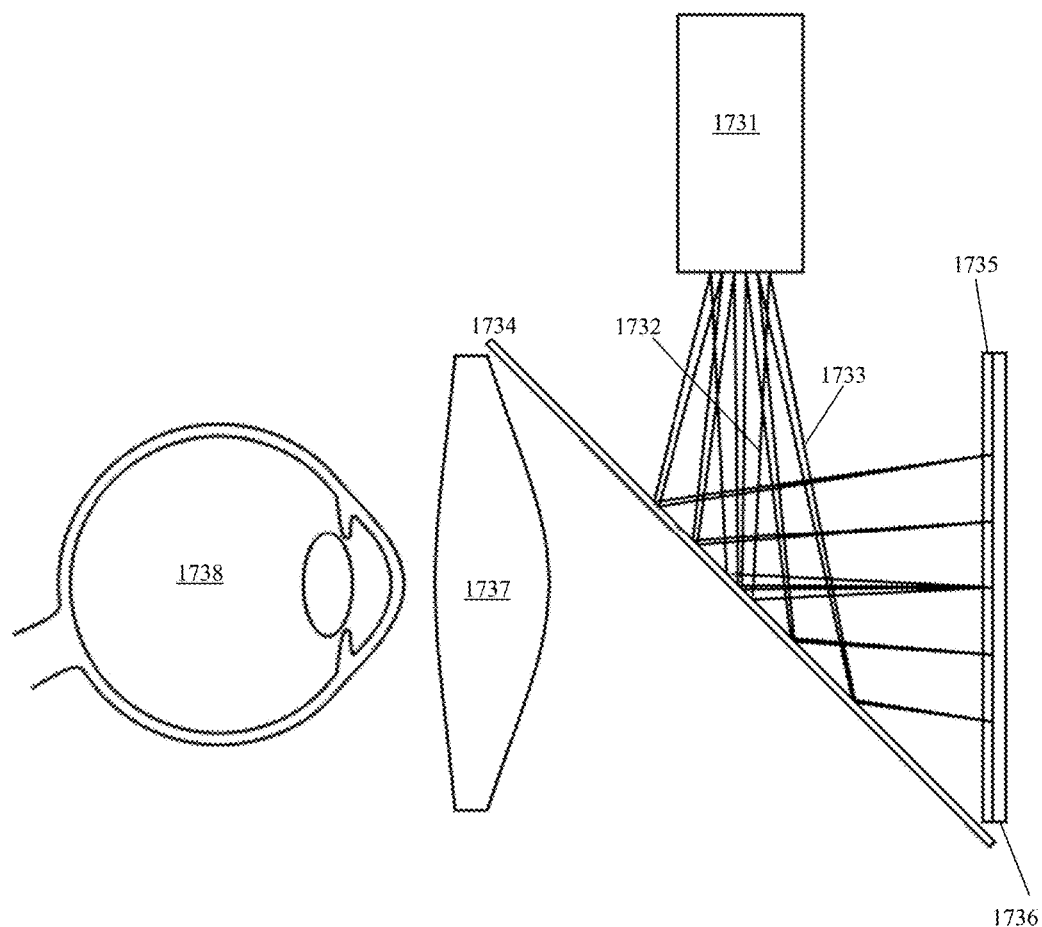
FIG. 17D illustrates the elements for generating an image with large and small parts that are already optically combined, with the ability to hide the duplicated images of the small part and show only one of them.
Figure 20:
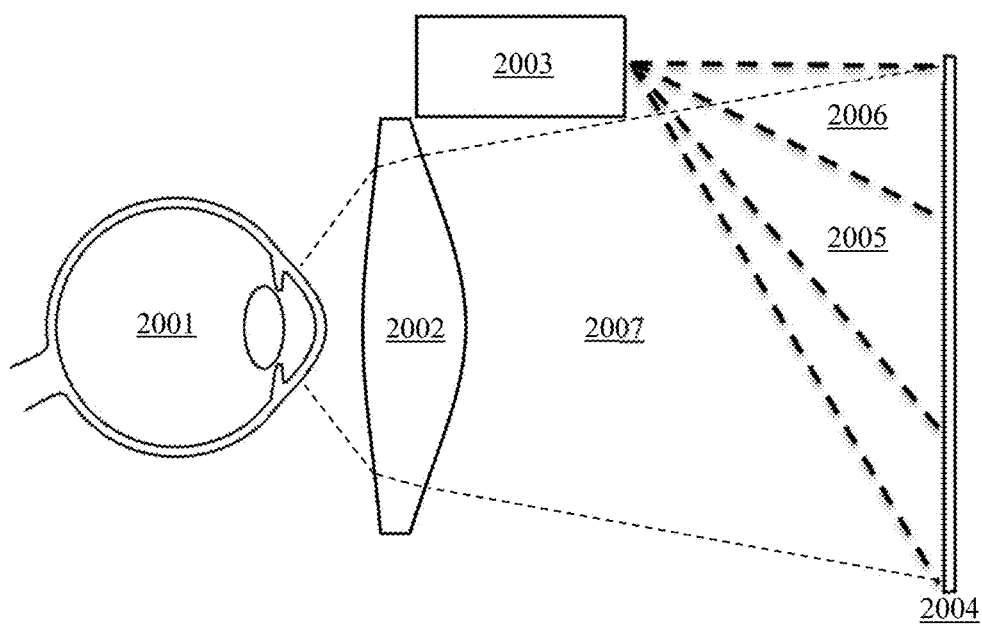
FIG. 20 shows an embodiment of the mounting of the present inventions in a head-mounted display were the physical size is reduced.
Figure 21:
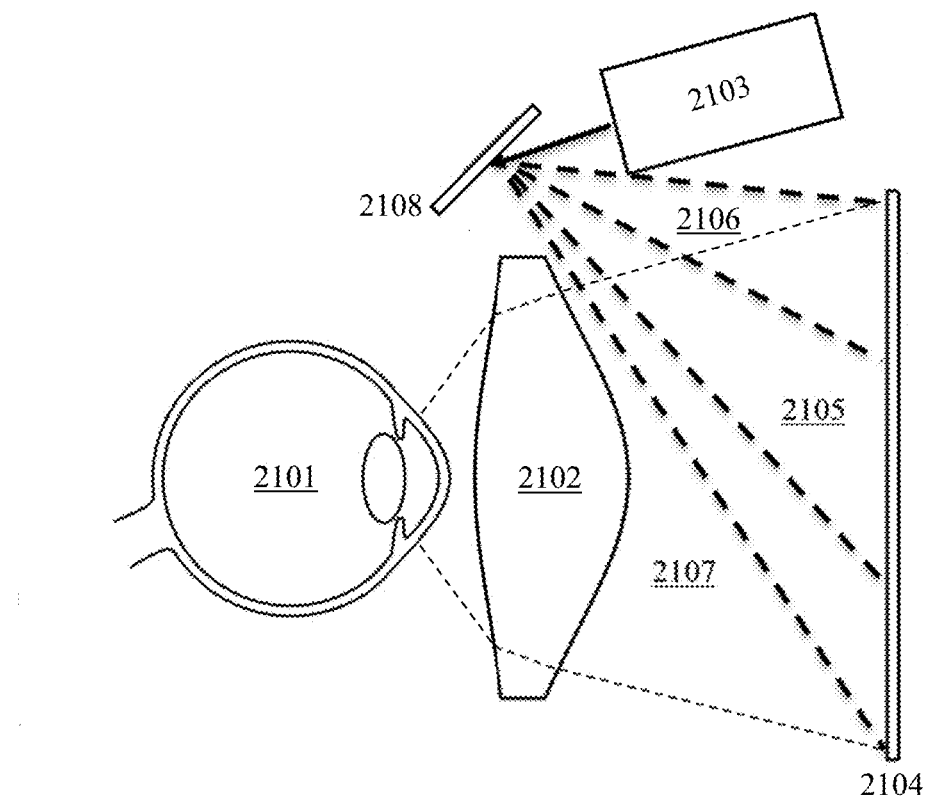
FIG. 21 shows an embodiment of the mounting of the present inventions in a head-mounted display using a mirror to reduce the physical size of the unit.

Alternatively, it is also possible to use a LCD display with its reflective and backlight layers removed as an optical masking element with a single microdisplay, display or projector (or two, as seen in FIG. 13) generating the image or beam without a second display 1728, as illustrated in FIG. 17D. In case of time-multiplexed approach as described in FIG. 2 a beam splitter 1725 is also not necessary as illustrated in FIG. 20 and FIG. 21.

In the FIG. 17D illustration, the elements for generating a duplicated image or beam are not illustrated and are in 1731 which represents a microdisplay, display or projector or two microdisplays, displays or projectors with the wide beam and duplicated beam already optically combined as described in FIG. 13 and FIG. 14. Light cone (beam) of a single pixel of the wide beam 1732 and light cone (beam) of single pixel of a duplicate beam 1733 both focus to pixels on a screen 1736 on an image plane behind a LCD display optical masking element 1735 by being reflected from a beam splitter 1734. The screen 1736 is seen by the eye 1738 directly or through an eyepiece or waveguide 1737.

Figure 17E:
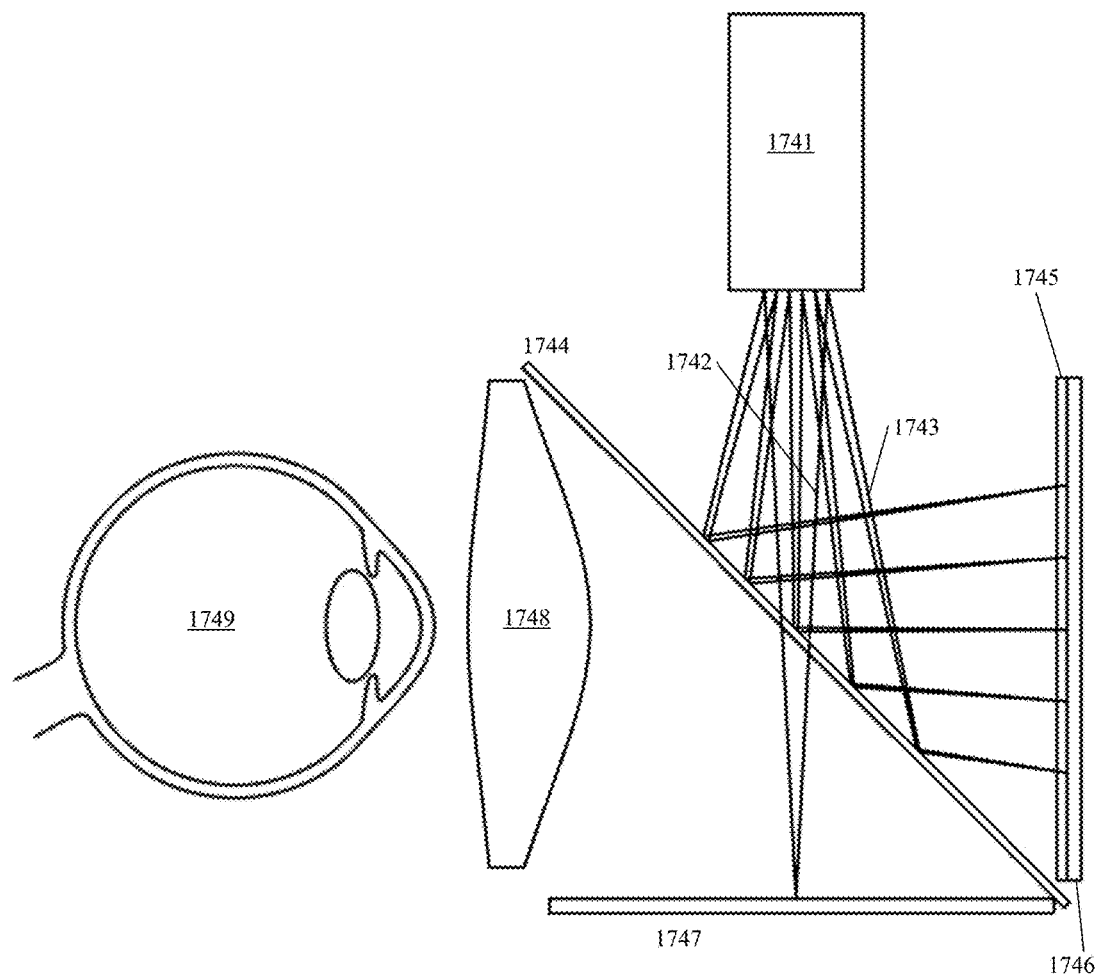
FIG. 17E shows the elements for generating an image with large and small parts that are already optically combined, with the ability to hide the duplicated images of the small part and show only one of them.

In case of splitting a microdisplay, display or projector into two or more parts as illustrated in FIG. 3 a beam splitter is needed and also a second screen as illustrated in FIG. 17E.

In the next illustration, FIG. 17E, the elements for generating a duplicated image or beam are not illustrated and are in 1741 which represents a microdisplay, display or projector or two microdisplays, displays or projectors with the wide beam and duplicated beam already optically combined as described in FIG. 13 and FIG. 14.

Light cone (beam) of a single pixel of the wide beam 1742 and light cone (beam) of a single pixel of a duplicate beam 1743 focus to pixels on a second screen 1747 and screen 1746 respectively, the latter on an image plane behind a LCD display optical masking element 1745 by being reflected from a beam splitter 1744. The wide beam 1742 passes through the beam splitter 1744 and the duplicate beam gets reflected from the beam splitter 1744 instead due to these beams having different polarization (or in the case the beam splitter is a band pass filter or dichroic filter, having different light wavelengths). The screens 1746 and 1747 are optically combined with the beam splitter 1744 and seen by the eye 1749 directly or through the eyepiece or waveguide 1748.

Figure 17F:
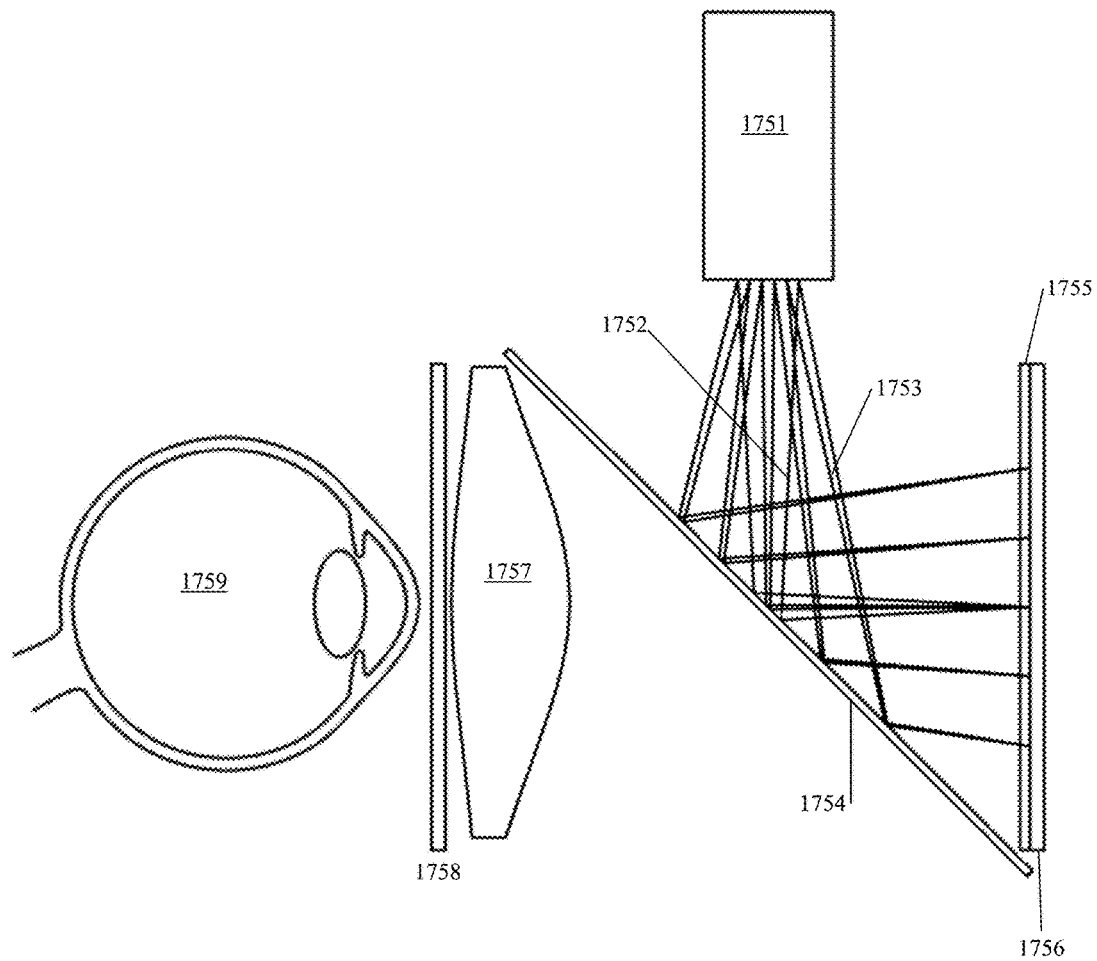
FIG. 17F demonstrates the elements for another embodiments for generating an image with large and small parts that are already optically combined, with the ability to hide the duplicated images of the small part and show only one of them.
Figure 17G:
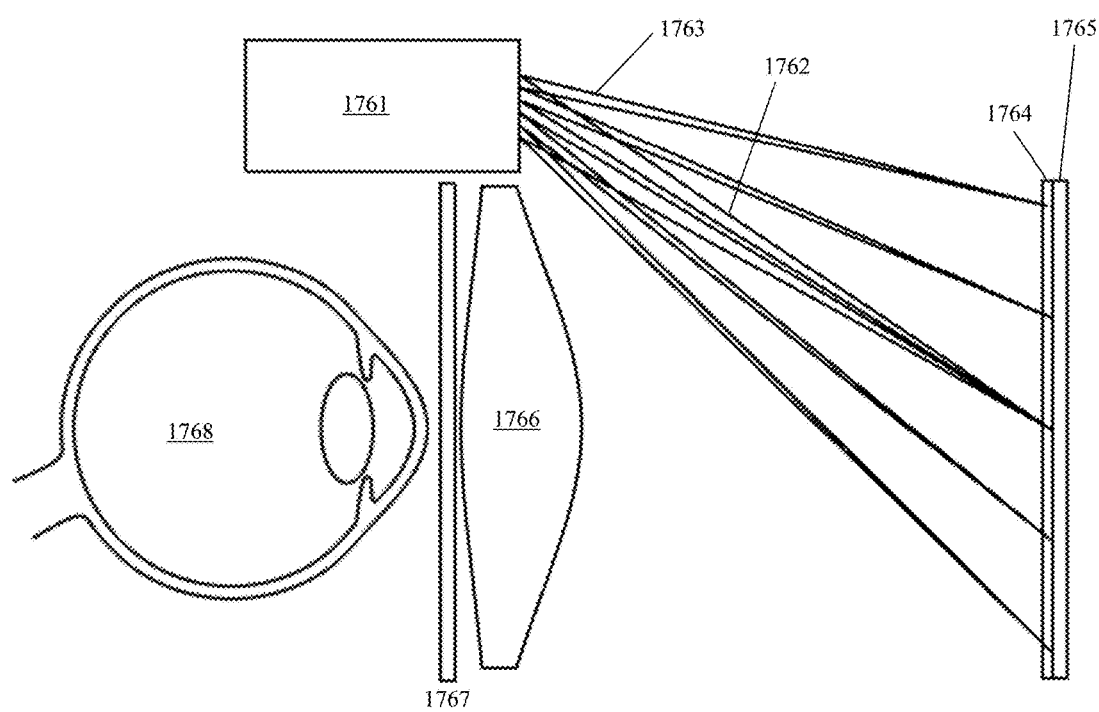
FIG. 17G presents another embodiments of the elements for generating an image with large and small parts that are already optically combined, with the ability to hide the duplicated images of the small part and show only one of them.

Alternatively, in case of splitting a microdisplay, display or projector into two or more parts as illustrated in FIG. 3 both a beam splitter and also a second screen are not needed similarly to the case of time-multiplexing as illustrated in FIG. 2, as illustrated in FIGS. 17F and 17G.

In FIG. 17F the elements for generating a duplicated image or beam are not illustrated and are in 1751 which represents a microdisplay, display or projector or two microdisplays, displays or projectors with the wide beam and duplicated beam already optically combined as described in FIG. 13 and FIG. 14.

Light cone (beam) of a single pixel of the wide beam 1752 and light cone (beam) of single pixel of a duplicate beam 1753 both focus to pixels on a screen 1756 on an image plane behind a LCD display optical masking element 1755 by being reflected from a beam splitter 1754. The screen 1756 is seen by the eye 1759 directly or through the eyepiece or waveguide 1757.

To be able to pass both the wide and duplicated beams through the same LCD display optical masking element but use the optical masking element for blocking only the duplicated beams, instead of a traditional LCD display optical masking element a switchable liquid crystal polarization rotator display is used which is an LCD display optical masking element without polarizers. A single polarizer 1758, not two as on LCD display optical masking elements and displays, is placed before the viewer's eye 1759 and in front of the eyepiece or waveguide 1757 or somewhere before it or left on the LCD display optical masking element 1755.

The wide beam in this instance is not polarized or in the polarization state the polarizer 1758 is not going to filter out after the wide beam passes through the switchable liquid crystal polarization rotator/LCD display optical masking element 1755. The duplicated beam gets masked as expected by the LCD display optical masking element 1755 and the polarizer 1758 while the wide beam does not or gets masked where the duplicated beam is not masked.

As mentioned previously the beam splitter 1754 is not necessary and used for reasons such as decreasing the physical dimensions of the apparatus. FIG. 17G illustrates the same system as FIG. 17F sans the beam splitter 1754.

In FIG. 17G the elements for generating a duplicated image or beam are not illustrated and are in 1761 which represents a microdisplay, display or projector or two microdisplays, displays or projectors with the wide beam and duplicated beam already optically combined as described in FIG. 13 and FIG. 14.

Light cone (beam) of a single pixel of the wide beam 1762 and light cone (beam) of single pixel of a duplicate beam 1763 both focus to pixels on a screen 1765 on an image plane behind a LCD display optical masking element 1764. The screen 1765 is seen by the eye 1768 directly or through the eyepiece or waveguide 1766.

To be able to pass the wide and duplicated beams through the same LCD display optical masking element but use the optical masking element for blocking only the duplicated beams, instead of a traditional LCD display optical masking element a switchable liquid crystal polarization rotator display is used which is an LCD display optical masking element without polarizers. A single polarizer 1767, not two as on LCD display optical masking element and displays, is placed before the viewer's eye 1768 and in front of the eyepiece or waveguide 1766 or somewhere before it or left on the LCD display optical masking element 1764.

The wide beam in this instance is not polarized or in the polarization state the polarizer 1767 is not going to filter out after the wide beam passes through the switchable liquid crystal polarization rotator/LCD display optical masking element without the polarizers 1764. The duplicated beam gets masked as expected by the LCD display optical masking element without the polarizers 1764 and the polarizer 1767 while the wide beam does not or gets masked where the duplicated beam is not masked.

With the optical masking element it is possible to show only one of the duplicate images at a time, however with digital manipulation of the source frame it is possible to have a digital and optical reconstruction of the original image visible anywhere on the duplicated image array area while hiding everything else with a positional accuracy up to the pixel resolution of the optical masking element and positioning speed equal to the few microsecond to millisecond pixel switching speed of the optical masking element.

Figure 18:
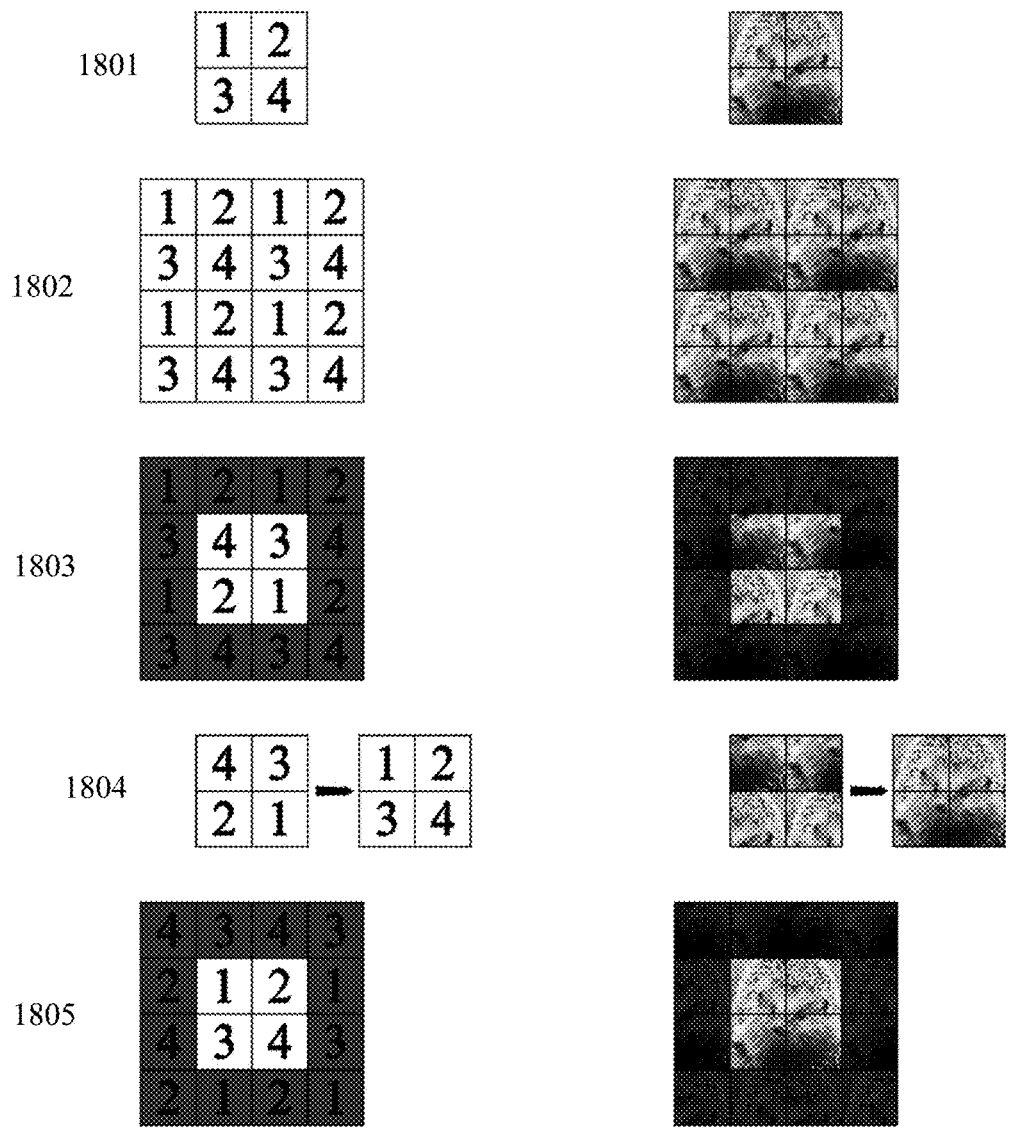
FIG. 18 illustrates digitally and optically rearranging portions of an image.

As an example, let's consider each duplicated image being made up for 4 parts, 1, 2, 3 and 4, as illustrated in FIG. 18, item 1801. In FIG. 18, the items on the left column illustrate these parts as squares with numbers while the right column uses actual image parts.

In FIG. 18, 4 of such duplicate images are stacked 1802. If we wanted to display only one duplicate in the middle of this array 1802, we wouldn't be able to as illustrated in item 1803.

However, if we take the original image 1801, partition it into 4 pieces digitally and reposition those pieces digitally as in 1804, then we will get the result we want even though we are displaying parts of 4 duplicates at once.

The duplicates are then masked and the original image 1801 properly reconstructed by optical and digital methods as seen in 1805.

Since the optical masking elements discussed such as DLP, LCoS or LCD microdisplays or LCD displays are usually not double the resolution of the lens array but much more, the images can be partitioned into 4 rectangles and rearranged digitally not only at the middle of the image but at any desired location on the image as seen in 1901, 1902, 1903, 1904 in FIG. 19 with the only limitation being the resolution of the source image display, microdisplay or projector and the resolution of the optical masking element. Of course the visible portion from the optical masking element cannot be larger than the size of a single duplicate image from the array.

Head-Mounted Display Embodiments

The above optical designs can work for many different types of image and video displays. In head-mounted displays, the small space requirements present additional challenges.

FIG. 20 shows a direct embodiment of the mounting of the present inventions in a head-mounted display. The variable-resolution optics 2003 as shown in FIGS. 4A, 4B, 5, 13, 14, 17 produces the high resolution small image 2005 and the low resolution large image 2006 that are sent directly to the screen 2004. A human eye 2001 looks through a lens 2002 or other optics that collects the light 2007 from the image on the screen 2004.

FIG. 21 shows an indirect embodiment of the mounting of the present inventions in a head-mounted display. The variable-resolution optics 2103 as shown in FIGS. 4A, 4B, 5, 13, 14, 17 produces an image that is reflected off of a mirror 2108. The high resolution small image 2105 and the low resolution large image 2106 from the mirror 2108 are sent to the screen 2104. A human eye 2101 looks through a lens 2102 or other optics that collects the light 2107 from the image on the screen 2104.

Figure 22:
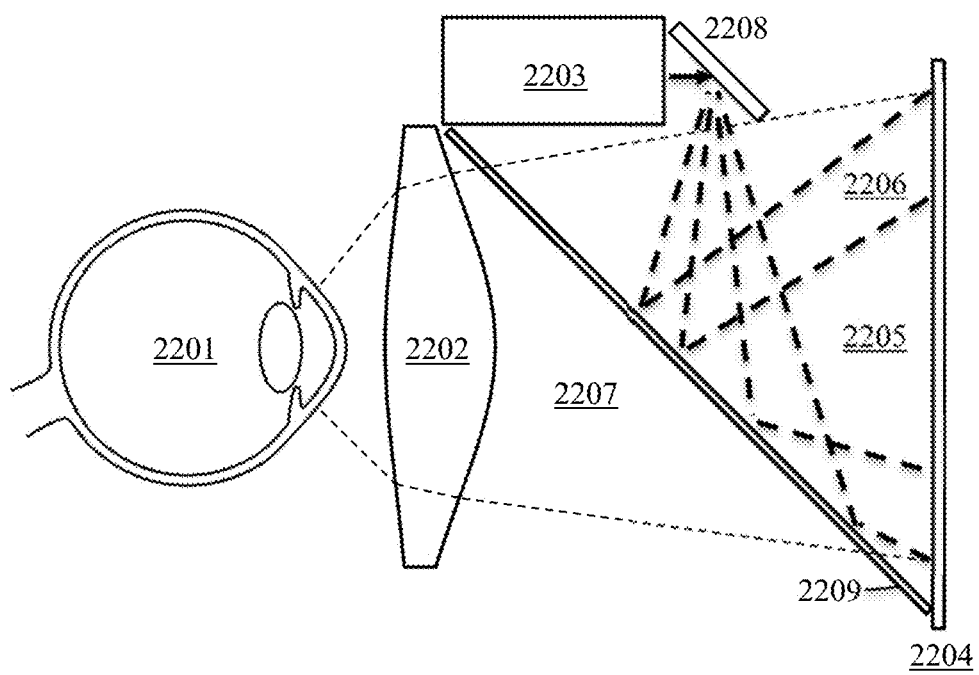
FIG. 22 shows an embodiment of the mounting of the present inventions in a head-mounted display using a mirror and a beam splitter to reduce the physical size of the unit.

FIG. 22 shows an indirect embodiment with a beam splitter of the mounting of the present inventions in a head-mounted display. The variable-resolution optics 2203 as shown in FIGS. 4A, 4B, 5, 13, 14, 17 produces an image that is reflected off of a mirror 2208. The mirror 2208 reflects the light to a beam splitter 2209 which reflects the high resolution small image 2205 and the low resolution large image 2206 onto the screen 2204. A human eye 2201 looks through a lens 2202 or other optics and through the beam splitter 2209 to see the light 2207 from the image on the screen 2204.

The foregoing devices and operations, including their implementation, will be familiar to, and understood by, those having ordinary skill in the art. All sizes and proportions used in this description could be scaled up or down or changed without impacting the scope of these inventions.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. An optical apparatus for creating a variable-resolution image stream on a screen, the apparatus comprising:
   a projector connected to a video source, where the projector transmits a light image stream in the form of a high resolution, small image component and a low resolution, large image component;
   an image steering element that directs the high resolution, small image component and the low resolution, large image component to a small image optical element and to a large image optical element;
   an image separation element that separates the high resolution, small image component and the low resolution, large image component into a high resolution, small image stream and a low resolution, large image stream;
   where the small image optical element and the large image optical element focus the low resolution, large image stream and the high resolution, small image stream on the screen such that the low resolution, large image stream and the high resolution, small image stream appear as the variable-resolution image stream on the screen.

2. The apparatus of claim 1 wherein the light image stream from the projector is time multiplexed between high resolution, small image component in a first frame and the low resolution, large image component in a next frame.

3. The apparatus of claim 2 wherein the image separation element is an optical shutter.

4. The apparatus of claim 1 wherein the light image stream from the projector has the high resolution, small image component on one part of each image and a low resolution, large image component on another part of each image.

5. The apparatus of claim 4 wherein the image separation element is an optical mask.

6. The apparatus of claim 1 wherein the screen is embedded in a virtual reality headset.

7. The apparatus of claim 1 wherein the small image optical element includes a lens array.

8. The apparatus of claim 7 further comprising a masking display to mask off unused portions of the high resolution, small image stream from the lens array.

9. The apparatus of claim 7 further comprising a masking microdisplay to mask off unused portions of the high resolution, small image stream from the lens array.

10. The apparatus of claim 1 further comprising a rotating optical slab to steer the high resolution, small image stream from the small image optical element.

11. The apparatus of claim 1 wherein the large image optical element is a lens that focuses the low resolution, large image stream to an outer portion of a field of view of a viewer.

12. The apparatus of claim 1 wherein the small image optical element is a lens that focuses the high resolution, small image stream to a center portion of a field of view of a viewer.

13. The apparatus of claim 1 wherein the screen is a viewer's retina.

14. The apparatus of claim 1 wherein the projector is a microdisplay.

15. The apparatus of claim 1 wherein the projector is a display.

16. An optical method for creating a variable-resolution image stream on a screen, the method comprising:
   creating a light image stream in the form of a high resolution, small image component and a low resolution, large image component with a projector connected to a video source;
   directing the high resolution, small image component and the low resolution, large image component, with an image steering element, to a small image optical element and to a large image optical element;
   separating the high resolution, small image component and the low resolution, large image component into a high resolution, small image stream and a low resolution, large image stream with an image separation element; and
   focusing, by the small image optical element and the large image optical element, the low resolution, large image stream and the high resolution, small image stream to form the variable-resolution image stream on the screen.

17. The method of claim 16 wherein the light image stream from the projector is time multiplexed between the high resolution, small image component in a first frame and the low resolution, large image component in a second frame.

18. The method of claim 17 wherein the image separation element is an optical shutter.

19. The method of claim 16 wherein the light image stream from the projector has the high resolution, small image component on one part of each image and a low resolution, large image component on another part of each image.

20. The method of claim 19 wherein the image separation element is an optical mask.

21. The method of claim 16 wherein the screen is embedded in a virtual reality headset.

22. The method of claim 16 wherein the small image optical element includes a lens array.

23. The method of claim 22 further comprising masking off unused portions of the high resolution, small image stream from the lens array with a masking display.

24. The method of claim 22 further comprising masking off unused portions of the high resolution, small image stream from the lens array with a masking microdisplay.

25. The method of claim 16 further comprising steering the high resolution, small image stream from the small image optical element using a rotating optical slab.

26. The method of claim 16 wherein the large image optical element is a lens that focuses the low resolution, large image stream to an outer portion of a field of view of a viewer.

27. The method of claim 16 wherein the small image optical element is a lens that focuses the high resolution, large image stream to a center portion of a field of view of a viewer.

28. The method of claim 16 wherein the screen is a viewer's retina.

29. The method of claim 16 wherein the projector is a microdisplay.

30. The method of claim 16 wherein the projector is a display.

\* \* \* \* \*